United States Patent
Miyakoshi et al.

(10) Patent No.: US 7,159,545 B2
(45) Date of Patent: Jan. 9, 2007

(54) VALVE TIMING CONTROL APPARATUS FOR INTERNAL COMBUSTION ENGINE AND CONTROL METHOD THEREOF

(75) Inventors: Ryo Miyakoshi, Isesaki (JP); Kenichi Machida, Isesaki (JP); Masahiko Watanabe, Atsugi (JP); Yoshiyuki Kobayashi, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 157 days.

(21) Appl. No.: 11/074,768

(22) Filed: Mar. 9, 2005

(65) Prior Publication Data

US 2005/0199200 A1 Sep. 15, 2005

(30) Foreign Application Priority Data

Mar. 12, 2004 (JP) ............................. 2004-070937
Feb. 14, 2005 (JP) ............................. 2005-036149

(51) Int. Cl.
*F01L 1/34* (2006.01)

(52) U.S. Cl. ................. 123/90.15; 123/90.17; 123/90.31; 123/347

(58) Field of Classification Search ............. 123/90.15, 123/90.16, 90.17, 90.18, 90.2, 90.27, 90.31, 123/345, 346, 347, 348; 464/1, 2, 160

See application file for complete search history.

(56) References Cited

U.S. PATENT DOCUMENTS 6,484,676 B1 * 11/2002 Shimizu et al. .......... 123/90.15
6,904,881 B1 * 6/2005 Hirowatari et al. ....... 123/90.15

FOREIGN PATENT DOCUMENTS

JP 11-241608 A 9/1999

* cited by examiner

*Primary Examiner*—Ching Chang
(74) *Attorney, Agent, or Firm*—Foley & Lardner LLP

(57) ABSTRACT

A valve timing control apparatus for an internal combustion engine which comprises a variable valve timing mechanism which varies an opening-and-closing timing of an intake valve and/or an exhaust valve of an engine, and in which the opening-and-closing timing at a time of starting the engine is set to a starting time timing which is at a further advance side than a maximum retard timing which is retarded at the maximum, said apparatus characterized in that, at a time of stopping the engine, the variable valve timing mechanism is controlled such that the opening-and-closing timing is made to be the starting time timing.

21 Claims, 22 Drawing Sheets

VALVE TIMING CONTROL APPARATUS FOR INTERNAL COMBUSTION ENGINE AND CONTROL METHOD THEREOF

BACKGROUND OF THE INVENTION

1. Field of the Invention

The present invention relates to a valve timing control apparatus for an internal combustion engine having a variable valve timing mechanism which varies an opening-and-closing timing (a valve timing) of an intake valve and/or an exhaust valve of an engine.

2. Description of the Related Art

As a valve timing control apparatus for an internal combustion engine, there is an apparatus disclosed in Japanese unexamined patent publication No. 11-241608. In this apparatus, the variable valve timing mechanism is controlled such that a valve timing of an intake valve is set to a maximum retard timing which is retarded at the maximum by inertial rotation immediately after stopping the engine, and on the other hand, the valve timing of the intake valve is set to a starting time timing at a further advance side than the maximum retard timing at the time of starting the engine.

The above-described variable valve timing mechanism in a conventional art is a so-called hydraulic mechanism, and because it is a structure in which a valve timing is varied by supplying an oil pressure due to a crankshaft being started to rotate by starting cranking at the time of starting the engine, a speed of varying the opening-and-closing timing depends on a discharge pressure of an oil pump.

Therefore, a delay in the time from the maximum retard timing to the starting time timing is brought about at the time of starting the engine in which the discharge pressure of the oil pump is low, and there is the possibility that fuel injection/ignition is carried out before reaching the starting time timing, and there is the concern that deterioration in emission and combustive instability are brought about.

Here, a delay as described above can be improved by using an electromagnetic mechanism as the variable valve timing mechanism. However, in order to avoid deterioration in emission and combustive instability at the time of starting, it has been required to be able to more accurately carry out starting in the starting time timing, such as that the valve timing of the engine valve is more rapidly controlled to be the starting time timing at the time of starting the engine, or the like.

SUMMARY OF THE INVENTION

The present invention has been achieved in consideration of such a problem, and an object of the present invention is to effectively prevent deterioration in emission and combustive instability at the time of starting the engine by improving the responsiveness when an opening-and-closing timing of an intake valve and/or an exhaust valve is set to a starting time timing appropriate for starting the engine at the time of starting an engine.

In order to achieve such an object, a first invention, at the time of starting an engine, controls an opening-and-closing timing of an intake valve and/or an exhaust valve of the engine to be a starting time timing at a further advance side than a maximum retard timing which is retarded at the maximum, and at the time of stopping the engine as well, controls the opening-and-closing timing to be the starting time timing.

Here, the first invention may be structured such that a variable valve timing mechanism which varies the opening-and-closing timing is driven such that the opening-and-closing timing is controlled to be the starting time timing, and a manipulated variable outputted to the variable valve timing mechanism is stored as a stopping time manipulated variable in a state in which the opening-and-closing timing is converged into the starting time timing, and a starting time manipulated variable which is outputted to the variable valve timing mechanism at the time of starting the engine is set on the basis of the stored stopping time manipulated variable.

Further, it is preferable that the opening-and-closing timing can be detected in an arbitrary timing, and the opening-and-closing timing, i.e., driving of the variable valve timing mechanism is controlled on the basis of an opening-and-closing timing detected in an arbitrary timing.

Moreover, a second invention, at the time of starting the engine sets a starting time manipulated variable on the basis of a manipulated variable set in advance in accordance with an engine temperature, and outputs the set starting time manipulated variable to a variable valve timing mechanism which varies an opening-and-closing timing of an intake valve and an exhaust valve, and controls the opening-and-closing timing to be a starting time timing at a further advance side than a maximum retard timing which is retarded at the maximum.

The other objects and features of this invention will become understood from the following description with accompanying drawings.

BRIEF EXPLANATION OF THE DRAWINGS

FIGS. 10 are schematic diagrams in which FIG. 9 is developed in a linear shape, and FIG. 10A shows a flow of a magnetic flux in an initial state, and FIG. 10B shows a flow of a magnetic flux when a hysteresis ring rotates.

DETAILED DESCRIPTION OF THE EMBODIMENT

Figure 1:
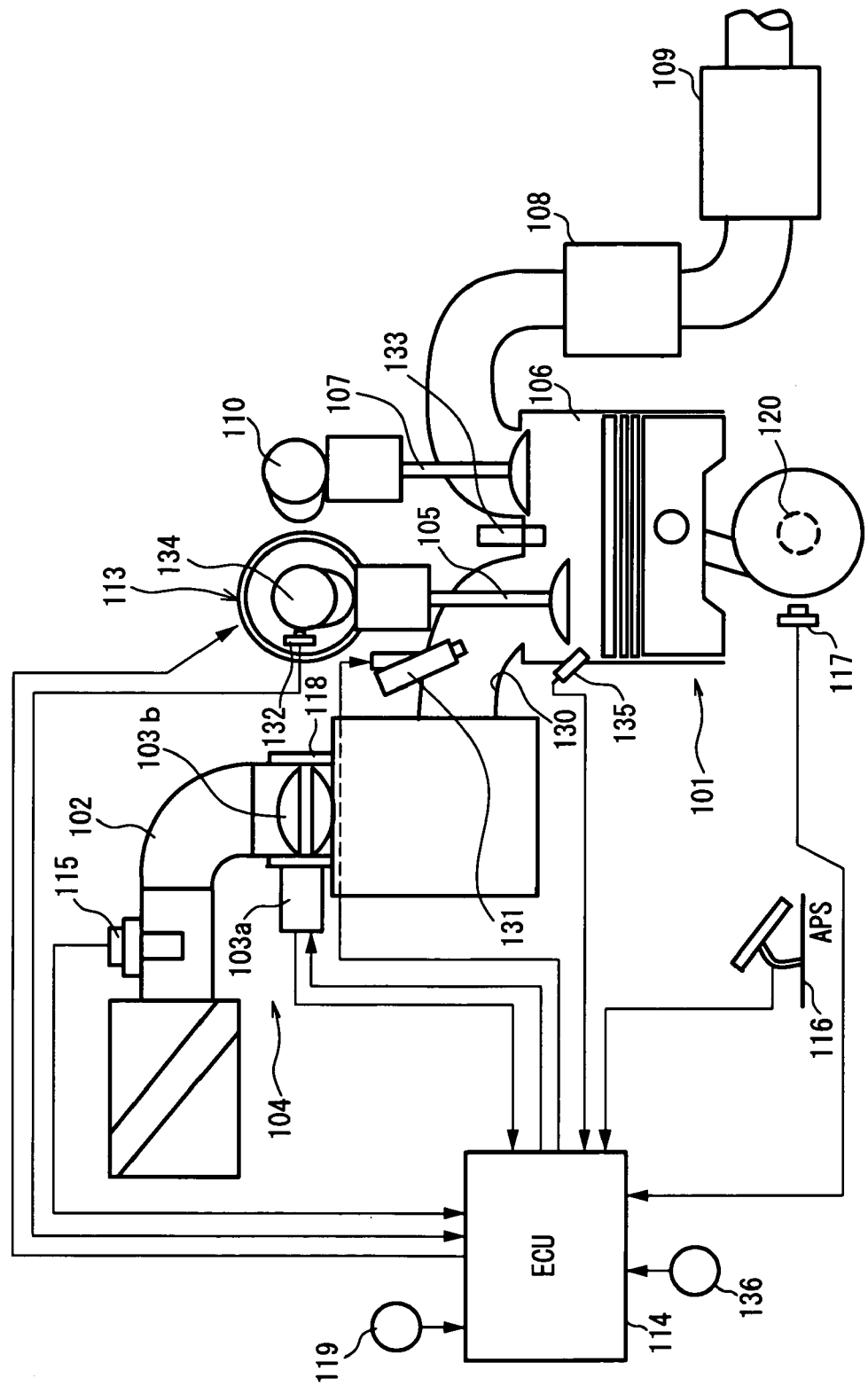
FIG. 1 is a system diagram of an internal combustion engine relating to an embodiment of the present invention.

Hereinafter, embodiments of the present invention will be described with reference to the drawings. FIG. 1 is a diagram of an internal combustion engine on vehicle in an embodiment. In FIG. 1, an electronic control throttle 104 is set at an intake pipe 102 of an internal combustion engine 101. Electronic control throttle 104 is a device controlling to open and close a throttle valve 103b by a throttle motor 103a. Then, air is sucked into a combustion chamber 106 of engine 101 via electronic control throttle 104 and an intake valve 105.

An ignition plug 133 is provided at each chamber of the engine, and spark ignition is carried out thereby, and air-fuel mixture is ignited and burnt. Exhaust gas is exhausted from combustion chamber 106 via an exhaust valve 107, and thereafter, the exhaust gas is purged through a front catalytic converter 108 and a rear catalytic converter 109, and the gas is discharged in the atmosphere.

Intake valve 105 and exhaust valve 107 are respectively controlled to open and close by cams which are provided at an intake side cam shaft 134 and an exhaust side camshaft 110.

A variable valve timing mechanism (VTC) 113 is provided at intake side cam shaft 134.

VTC 113 is a mechanism is a mechanism which varies an opening-and-closing timing of intake valve 105 (a valve timing) by varying a rotational phase of intake side camshaft 134 with respect to a crankshaft 102, and the details thereof will be described later.

Note that the present embodiment is structured such that VTC 113 is provided only at the side of intake valve 105. However, it may be a structure in which VTC 113 is provided at the side of exhaust valve 107, in spite of the side of intake valve 105 or in addition to the side of intake valve 105.

Note that an electromagnetic fuel injection valve 131 is provided at an intake port 130 in each cylinder, and fuel injection valve 131 is controlled to open the valve by an injection pulse signal from an engine control unit (ECU) 114, and jets out fuel adjusted to have a predetermined pressure to intake valve 105.

Output signals from various sensors are inputted to ECU 114 in which a microcomputer is built-in, and controls electronic control throttle 104, VTC 113, ignition plug 133, and fuel injection valve 131 by computing processing based on those signals.

As the various sensors, an accelerator pedal sensor APS 116 which detects an opening of an accelerator, an air flow meter 115 detecting an intake air quantity Qa of engine 101, a crank angle sensor 117 which takes a reference crank angle signal REF at a reference rotational position at each crank angle of 180 degrees, and takes a unit angle signal POS at each unit crank angle out of crankshaft 120, a throttle sensor 118 detecting an opening TVO of throttle valve 103b, a water temperature sensor 119 detecting a cooling water temperature Tw in engine 101, a cam sensor 132 taking a cam signal CAM at a reference rotational position at each cam angle of 90 degrees (a crank angle of 180 degrees) out of intake side cam shaft 134, a pressure sensor 135 which detects a combustion pressure in chamber 106, a voltage sensor 136 which detects a battery voltage Vb, or the like are provided. Note that an engine rotational speed Ne is calculated on the basis of a period of the reference crank angle signal REF or a number of generating unit angle signals POS per unit time.

Next, the structure of VTC mechanism 113 will be described with reference to FIG. 2 to FIG. 14.

Figure 2:
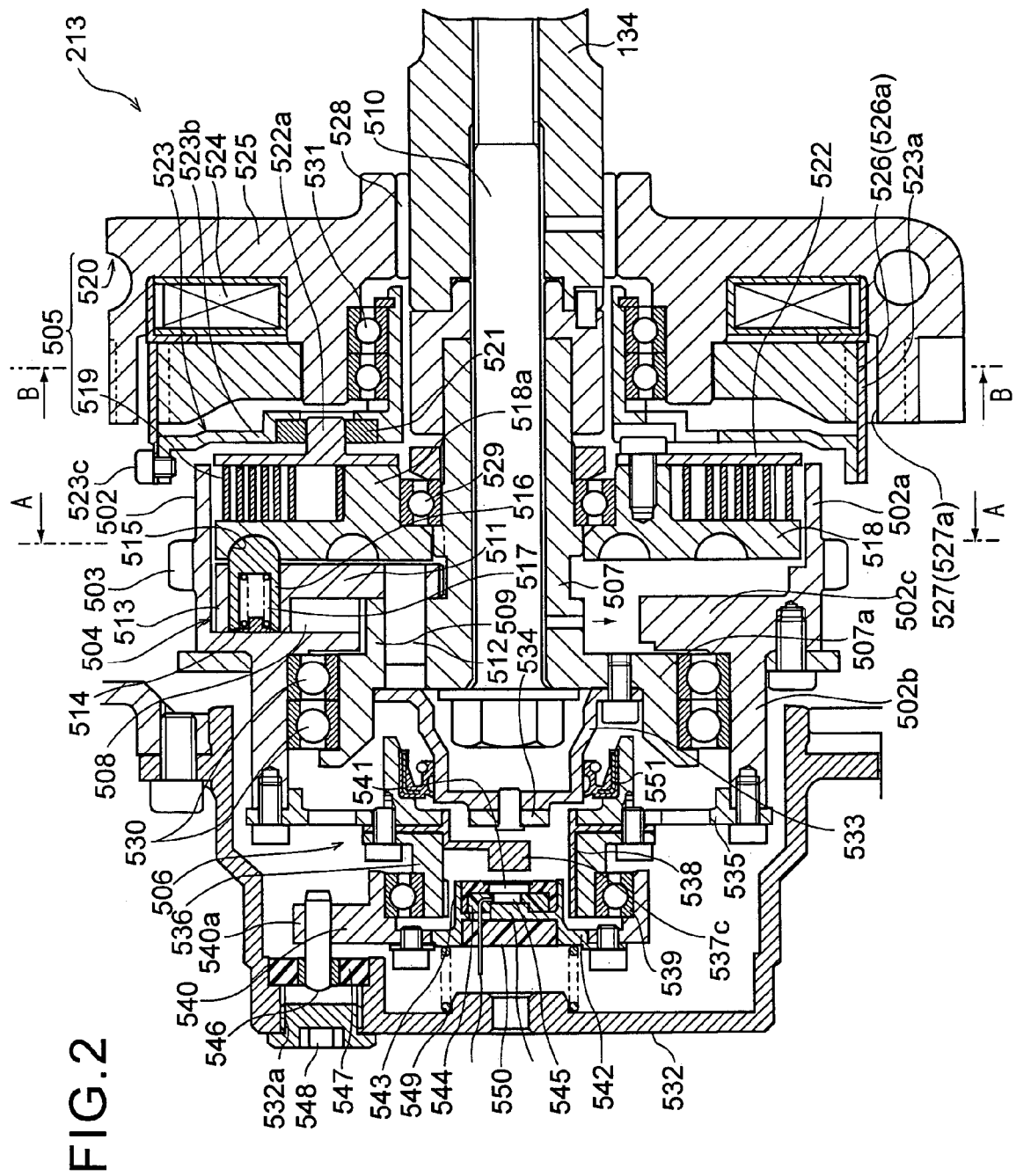
FIG. 2 is a sectional view showing a variable valve timing mechanism (VTC) relating to the embodiment.

As shown in FIG. 2, VTC mechanism 113 has a timing sprocket 502 which is assembled into the front end portion of camshaft 134 so as to be relatively rotatable, and which is made to link with crankshaft 120 via a timing chain (not shown), an assembling angle operating mechanism 504 which is disposed at an inner peripheral side of timing sprocket 502, and operates an assembling angle between timing sprocket 502 and camshaft 134, operating force providing means 505 which is disposed at the rear side which is closer to camshaft 134 than assembling angle operating mechanism 504, and which drives assembling angle operating mechanism 504, relative displacement detecting means 506 detecting an angle of relative rotational displacement (a rotational phase) of camshaft 134 with respect to timing sprocket 502, and a VTC cover 532 which is mounted on a cylinder head cover of the cylinder head, and which covers the front surfaces of assembling angle operating mechanism 504 and relative displacement detecting means 506.

In VTC 113, a driven shaft member 507 is fixed to the end portion of camshaft 134 by a cam bolt 510.

A flange 507a is provided so as to be integrated with driven shaft member 507.

Timing sprocket 502 is structured from a large-diameter cylinder portion 502a at which a gear portion 503 with which the timing chain is engaged is formed, a small-diameter cylinder portion 502b, and a disk portion 502c connecting between cylinder portion 502a and cylinder portion 502b.

Cylinder portion 502b is assembled so as to be rotatable by a ball bearing 530 with respect to flange 507a of driven shaft member 507.

Figure 3:
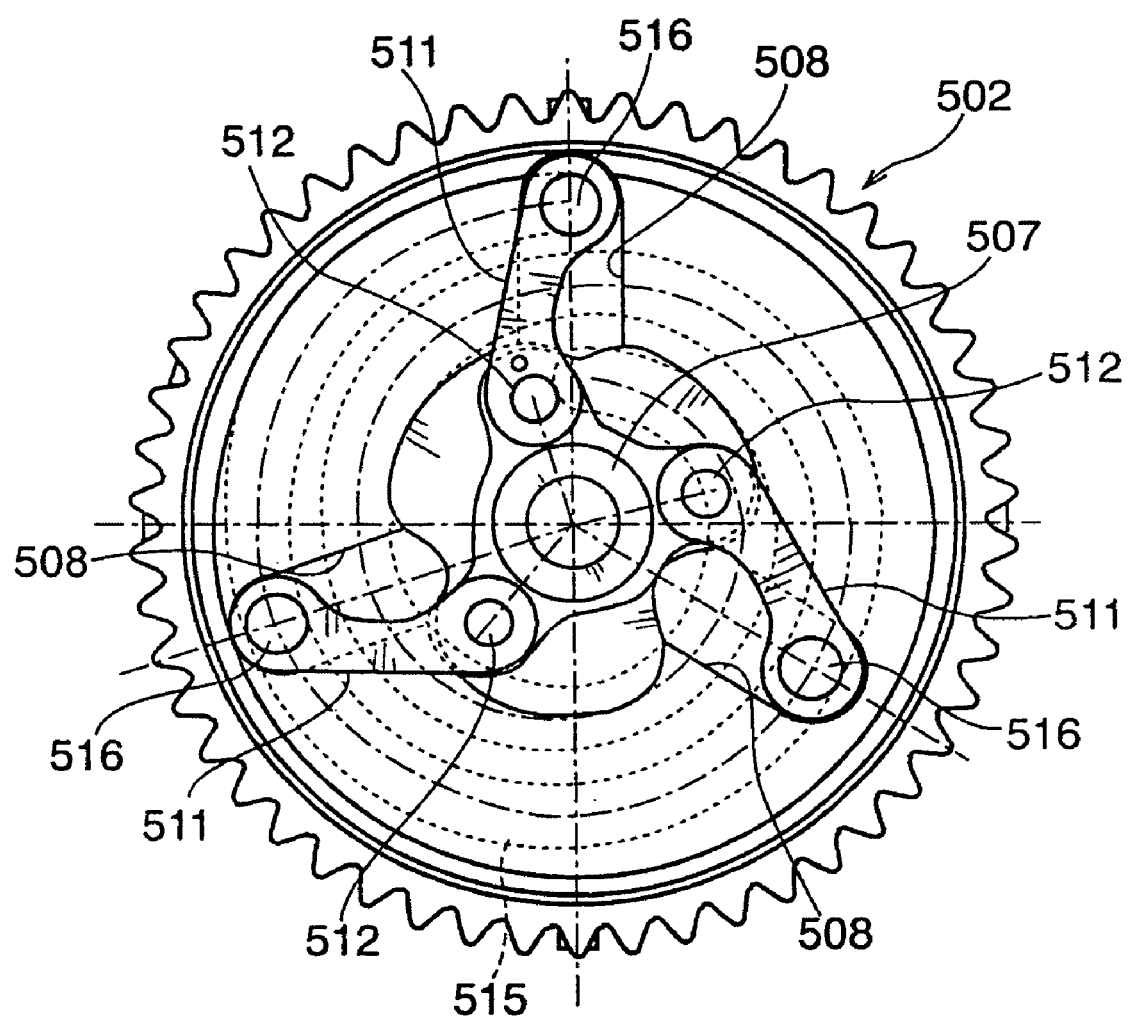
FIG. 3 is a diagram showing the VTC in a state of the maximum retard.
Figure 4:
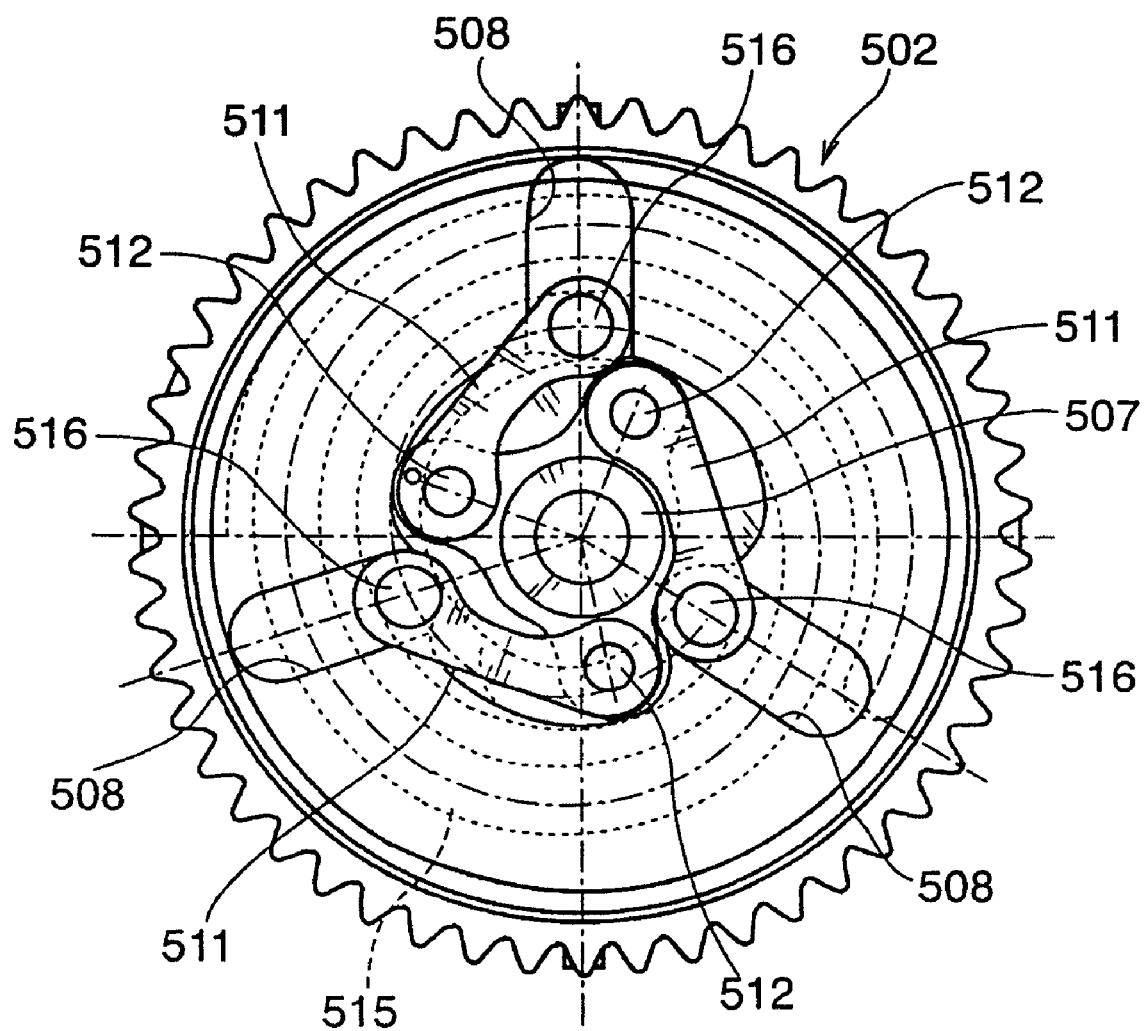
FIG. 4 is a diagram showing the VTC in a state of the maximum advance.
Figure 5:
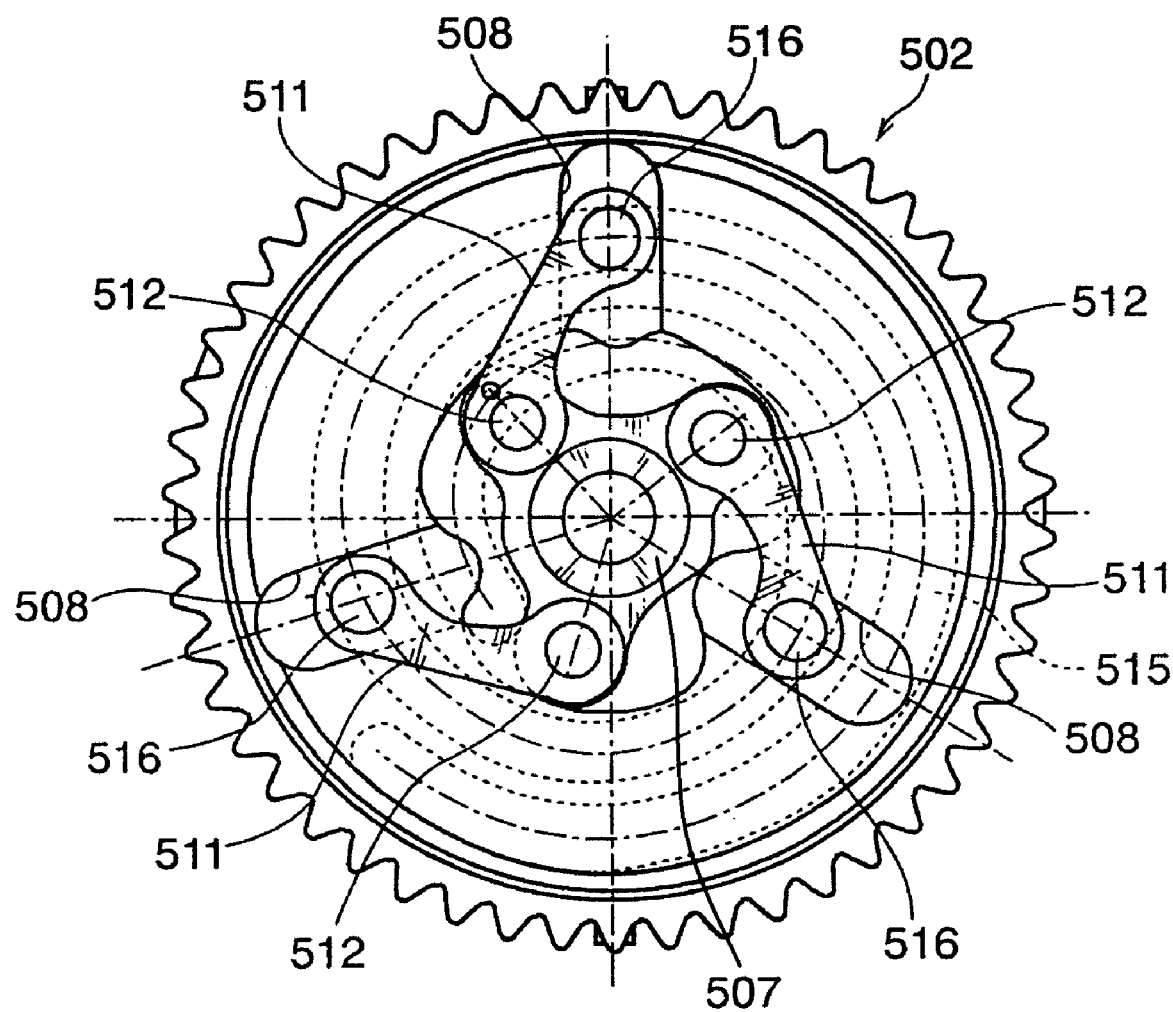
FIG. 5 is a diagram showing the VTC in a state of the intermediate advance.

As shown in FIG. 3 to FIG. 5 (corresponding to the cross-section taken along A—A of FIG. 2), three grooves 508 are formed in a radial pattern along radial directions of timing sprocket 502 at the surface at the side of cylinder portion 502b of the disk portion 502c.

Further, three protruding portions 509 protruding in a radial pattern in radial directions are formed so as to be integrated with the camshaft 134 side end surface of flange portion 507a of driven shaft member 507.

The base ends of three links 511 are respectively connected to respective protruding portions 509 so as to be rotatable by pins 512.

Cylindrical lobes 513 engaging with the respective grooves 508 so as to be freely rockable are formed so as to be integrated with the top ends of respective links 511.

Because respective links 511 are connected to driven shaft member 507 via pins 512 in a state in which respective lobes 513 engage with the corresponding grooves 508, when the top end sides of links 511 are displaced along grooves 508 by receiving external force, timing sprocket 502 and driven shaft member 507 are relatively rotated by the effects of respective links 511.

Further, accommodating holes 514 opening toward camshaft 134 side are formed at lobes 513 of respective links 511.

An engagement pin 516 engaging with a spiral slot 515 which will be described later, and a coil spring 517 urging the engagement pin 516 against spiral slot 515 side are accommodated in the accommodating hole 514.

On the other hand, a disk type intermediate rotator 518 is supported to be freely pivotable via a bearing 529 at driven shaft member 507 which is further at camshaft 134 side than the protruding portion 509.

Spiral slot 515 is formed at the end surface (the protruding portion 509 side) of intermediate rotator 518, and engagement pins 516 at the top ends of respective links 511 are engaged with spiral slot 515.

Spiral slot 515 is formed so as to gradually reduce the diameter along the rotational direction of timing sprocket 502.

Accordingly, when intermediate rotator 518 is relatively displaced in the retard direction with respect to timing sprocket 502 in a state in which the respective engagement pins 516 engage with spiral slot 515, the top end portions of respective links 511 are moved toward the inside in the radial direction by being led by spiral slot 515 while being guided by grooves 508.

In contrast thereto, when intermediate rotator 518 is relatively displaced in the advance direction with respect to timing sprocket 502, the top end portions of respective links 511 are moved toward the outside in the radial direction.

Assembling angle operating mechanism 504 is structured from grooves 508, links 511, lobes 513, engagement pins 516, intermediate rotator 518, spiral slot 515, and the like of timing sprocket 502.

When an operating force for rotations is inputted from operating force providing means 505 to intermediate rotator 518, the top ends of links 511 are displaced in radial directions, and the displacement is transmitted as a turning force which varies an angle of the relative displacement between timing sprocket 502 and driven shaft member 507 via links 511.

Operating force providing means 505 has a spiral spring 519 urging intermediate rotator 518 in the rotational direction of timing sprocket 502, and a hysteresis brake 520 generating braking force which rotates intermediate rotator 518 in a direction opposite to the rotational direction of timing sprocket 502.

Here, ECU 114 controls the braking force of hysteresis brake 520 in accordance with an operating state of the internal combustion engine 101, and in accordance therewith, intermediate rotator 518 can be relatively rotated with respect to timing sprocket 502 up to a position where the urging force of spiral spring 519 and the braking force of hysteresis brake 520 are made to be in balance.

Figure 6:
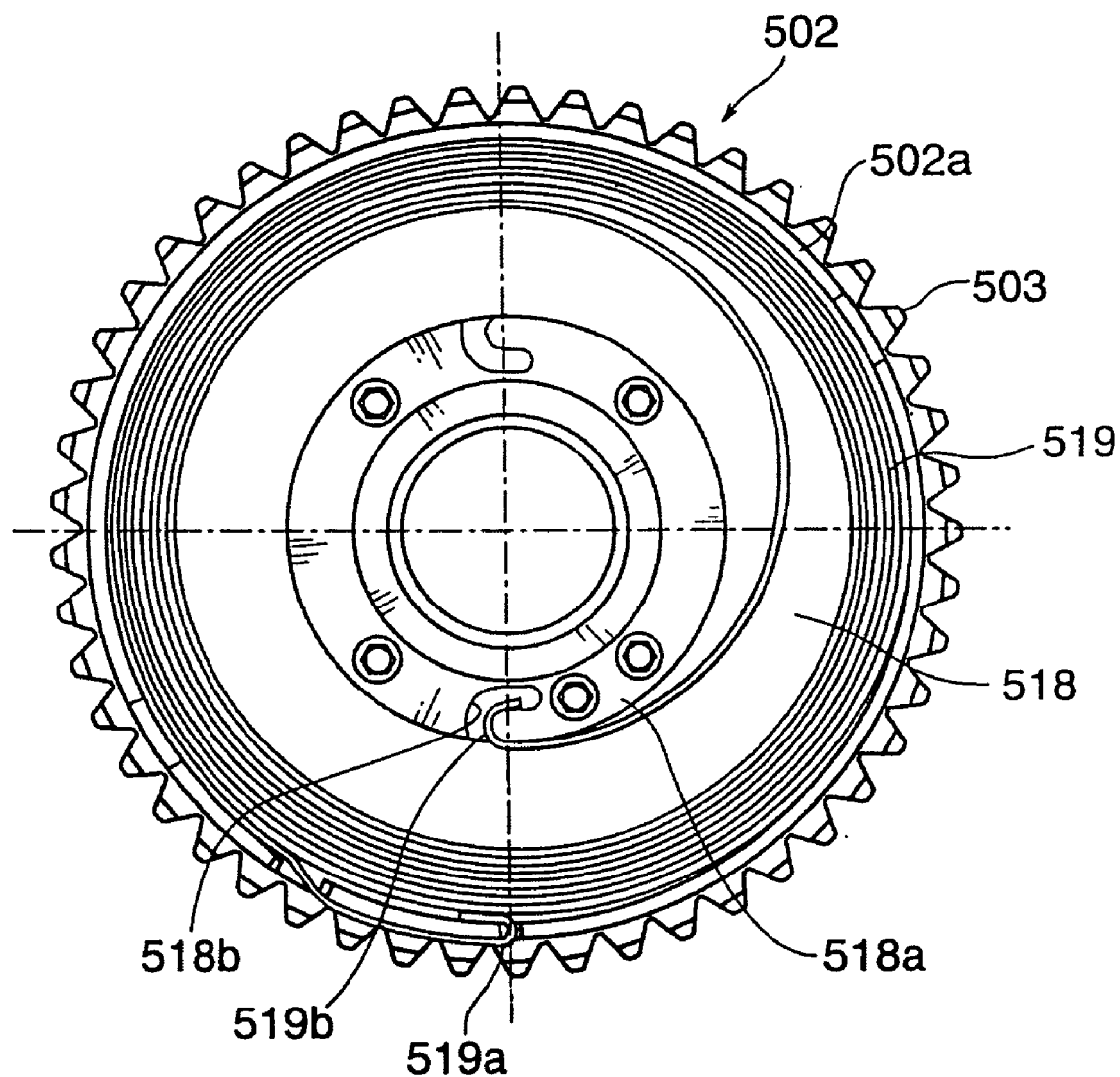
FIG. 6 is a diagram showing a state of attaching a spiral spring in the VTC.
Figure 7:
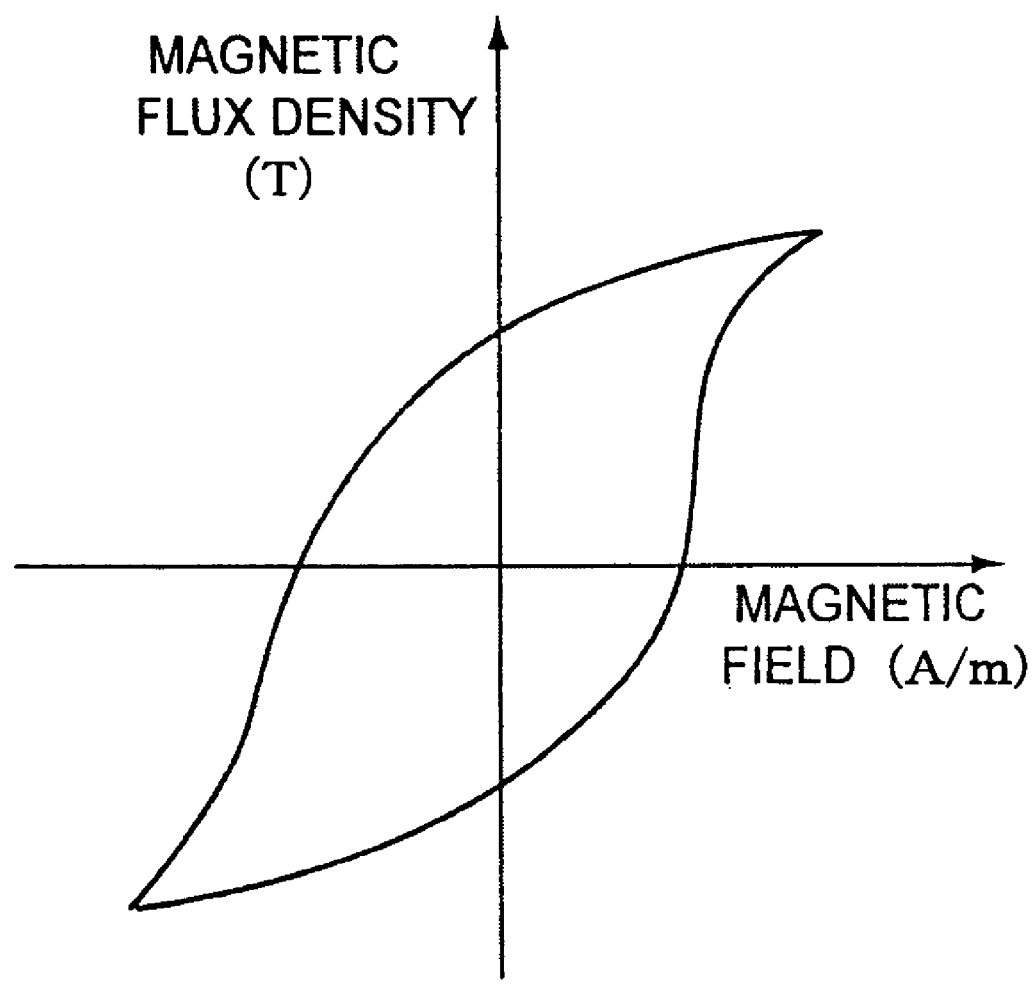
FIG. 7 is a graph showing a characteristic of a variation in a magnetic flux density of a hysteresis material in the VTC.

As shown in FIG. 6, spiral spring 519 is disposed in cylinder portion 502a of timing sprocket 502, and an outer peripheral end portion 519a is engaged with the inner periphery of cylinder portion 502a, and an inner peripheral end portion 519b is engaged with an engagement slot 518b of a base portion 518a of intermediate rotator 518.

Hysteresis brake 520 has a hysteresis ring 523, an electromagnetic coil 524 serving as magnetic field control means, and a coil yoke 525 inducing magnetism of electromagnetic coil 524.

Hysteresis ring 523 is attached to the rear end portion of intermediate rotator 518 via a retainer plate 522 and a protrusion 522a provided so as to be integrated with the rear end surface of retainer plate 522.

Energizing (exciting current) to electromagnetic coil 524 is controlled by ECU 114 in accordance with an operating state of the engine.

Hysteresis ring 523 is structured from a cylinder portion 523a, and a disk type cylinder portion 523b to which cylinder portion 523a is connected by a screw 523c.

It is structured such that base portion 523a is connected to retainer plate 522 due to respective protrusions 522a being press-fitted into bushes 521 provided at positions at uniform intervals in the circumferential direction.

Further, hysteresis ring 523 is formed from a material having the characteristic that the magnetic flux is varied so as to have a phase delay with respect to a variation in the external magnetic field (refer to FIG. 7), and cylinder portion 523b receives braking effect by coil yoke 525.

Coil yoke 525 is formed so as to surround electromagnetic coil 524, and the outer peripheral surface thereof is fixed to a cylinder head out of the drawing.

Further, the side of the inner periphery of coil yoke 525 supports camshaft 134 to be freely pivotable via a needle bearing 528, and the side of base portion 523a of hysteresis ring 523 is supported so as to freely pivotable by a ball bearing 531.

Then, a pair of facing surfaces 526 and 527 which face one another via a ring-shaped gap are formed at the side of intermediate rotator 518 of coil yoke 525.

Figure 8:
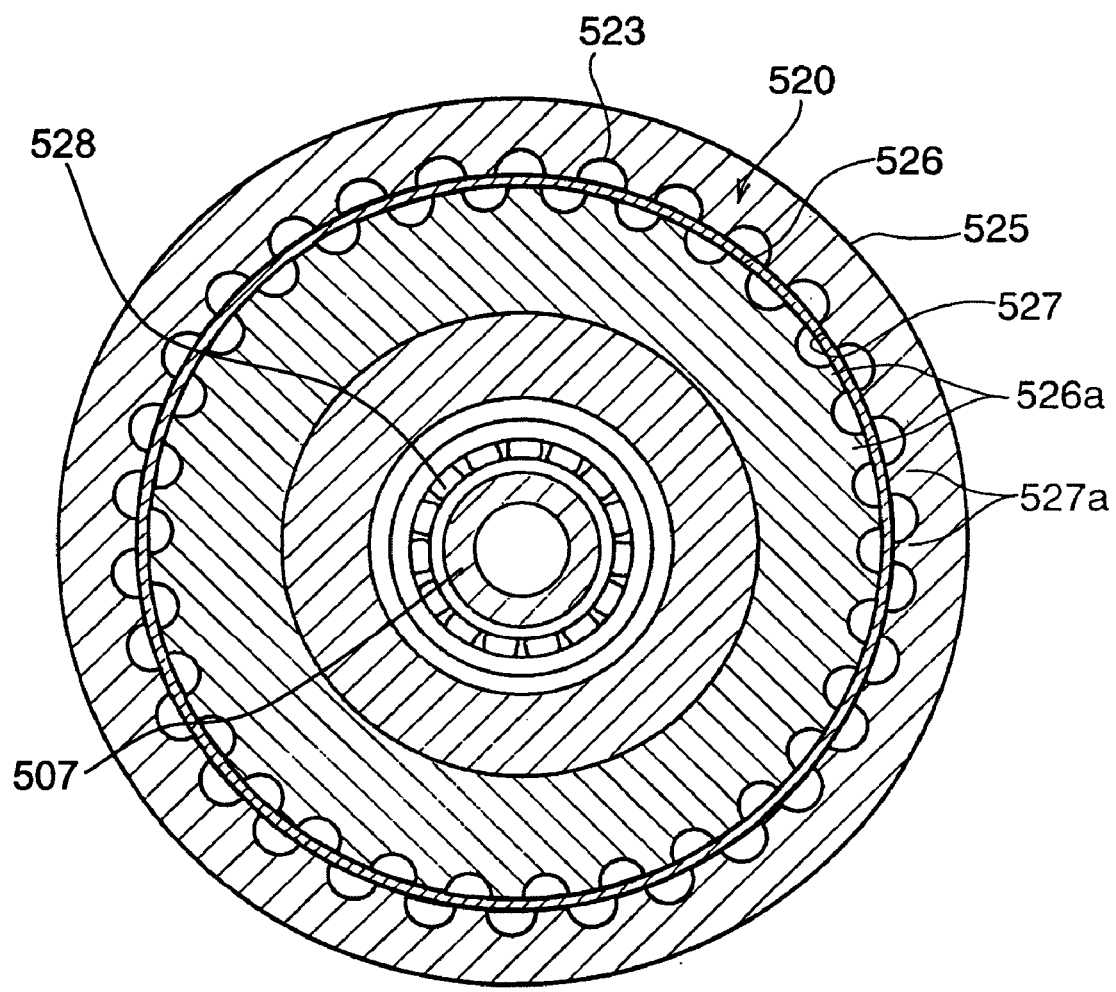
FIG. 8 is a diagram showing a hysteresis brake in the VTC, and corresponds to the cross-section taken along B—B in FIG. 2.

In the pair of facing surfaces 526 and 527, a plurality of irregularities are sequentially formed along the circumferential direction as shown in FIG. 8 (corresponding to the cross-section taken along B—B of FIG. 2), and convex portions 526a and 527a among those irregularities structure a magnetic pole (a magnetic field generating unit).

Then, convex portions 526a on the one facing surface 526 and convex portions 527a on the other facing surface 527 are disposed alternately in the circumferential direction, and adjacent convex portions 526a and 527a of facing surfaces 526 and 527 are entirely shifted in the circumferential direction.

Figure 9:
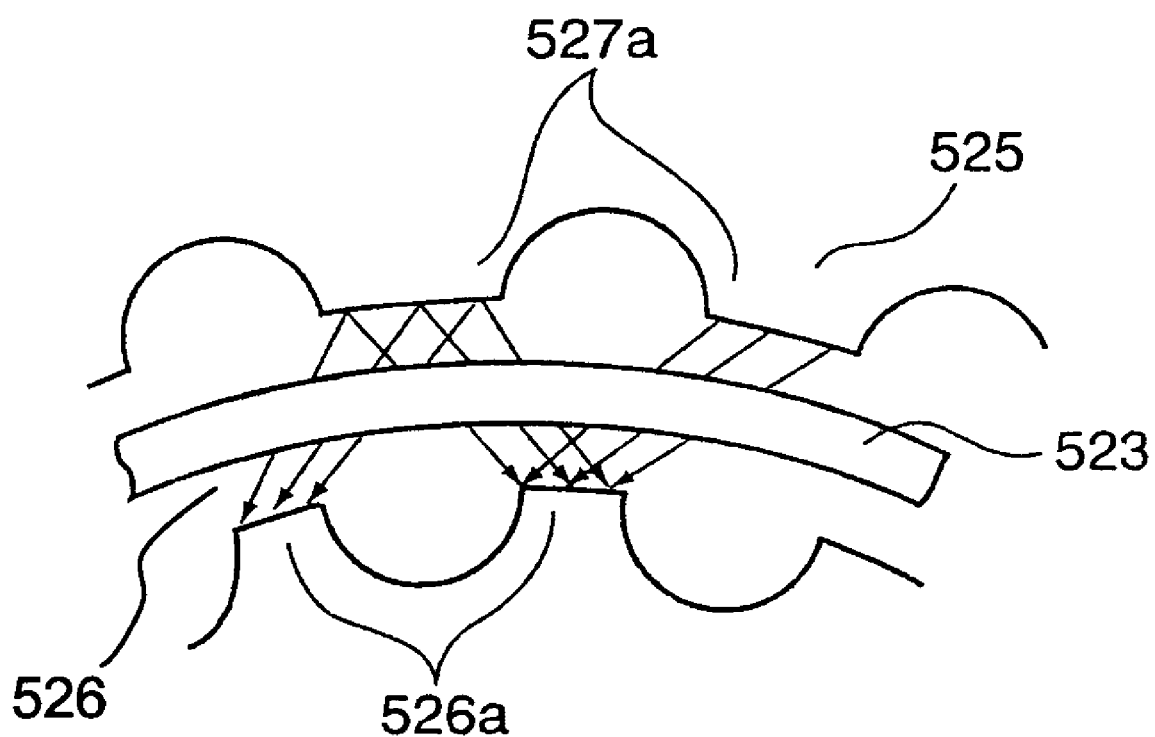
FIG. 9 is elements on large scale of FIG. 8, and shows directions of magnetic fields in the hysteresis brake.

Accordingly, a magnetic field deflected in the circumferential direction is generated between convex portions 526a and 527a adjacent to one another of facing surfaces 526 and 527 by excitation of electromagnetic coil 524 (refer to FIG. 9). Note that cylinder portion 523a of hysteresis ring 523 is set in the gap between both facing surfaces 526 and 527 in a non-contacting state.

Figure 10:
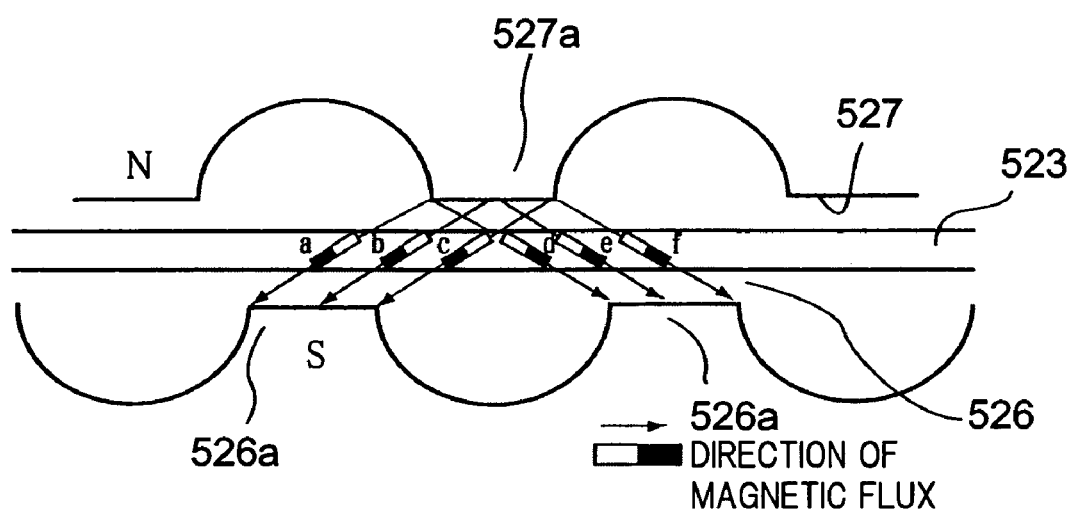
Figure 10:
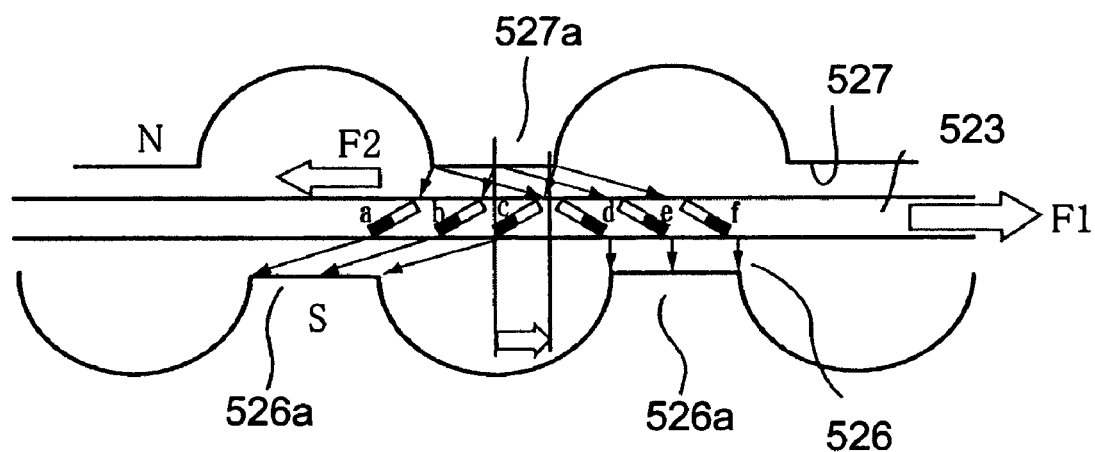

Here, the principle of operation of hysteresis brake 520 will be described by using FIG. 10. FIG. 10A shows a state in which hysteresis ring 523 (hysteresis material) is magnetized first, and FIG. 10B shows a state in which hysteresis ring 523 is displaced (rotated) from the state of FIG. 10A.

In the state of FIG. 10A, a flow of a magnetic flux is generated in hysteresis ring 523 so as to go along a direction of a magnetic field between both facing surfaces 526 and 527 of coil yoke 525 (a direction of a magnetic field going from convex portion 527a of facing surface 527 to convex portion 526a of facing surface 526).

When hysteresis ring 523 is transferred from this state to the state shown in FIG. 10B by receiving an external force F1, hysteresis ring 523 is displaced in the external magnetic field. Therefore, the magnetic flux inside hysteresis ring 523 has a phase delay at that time, and the direction of the magnetic flux inside hysteresis ring 523 is shifted (inclined) with respect to the direction of the magnetic field between facing surfaces 526 and 527.

Accordingly, a flow of the magnetic flux (line of magnetic force) entering hysteresis ring 523 from convex portion 527a of facing surface 527 and a flow of the magnetic flux (line of magnetic force) going from hysteresis ring 523 toward convex portion 526a of the other facing surface 526 are distorted, and at that time, a pull-against force such that the distortions in the magnetic fluxes are corrected is applied between facing surfaces 526 and 527 and hysteresis ring 523, and the pull-against force serves as a drag F2 braking hysteresis ring 523.

Namely, with respect to hysteresis brake 520, as described above, when hysteresis ring 523 is displaced in the magnetic field between facing surfaces 526 and 527, braking force is generated due to a divergence between the direction of the magnetic flux and the direction of the magnetic field inside hysteresis ring 523, and the braking force is made to be a constant value which is substantially in proportion to the strength of the magnetic field, i.e., a magnitude of an exciting current of electromagnetic coil 524 regardless of a rotational speed of hysteresis ring 523 (a relative velocity between facing surfaces 526 and 527 and hysteresis ring 523).

Figure 11:
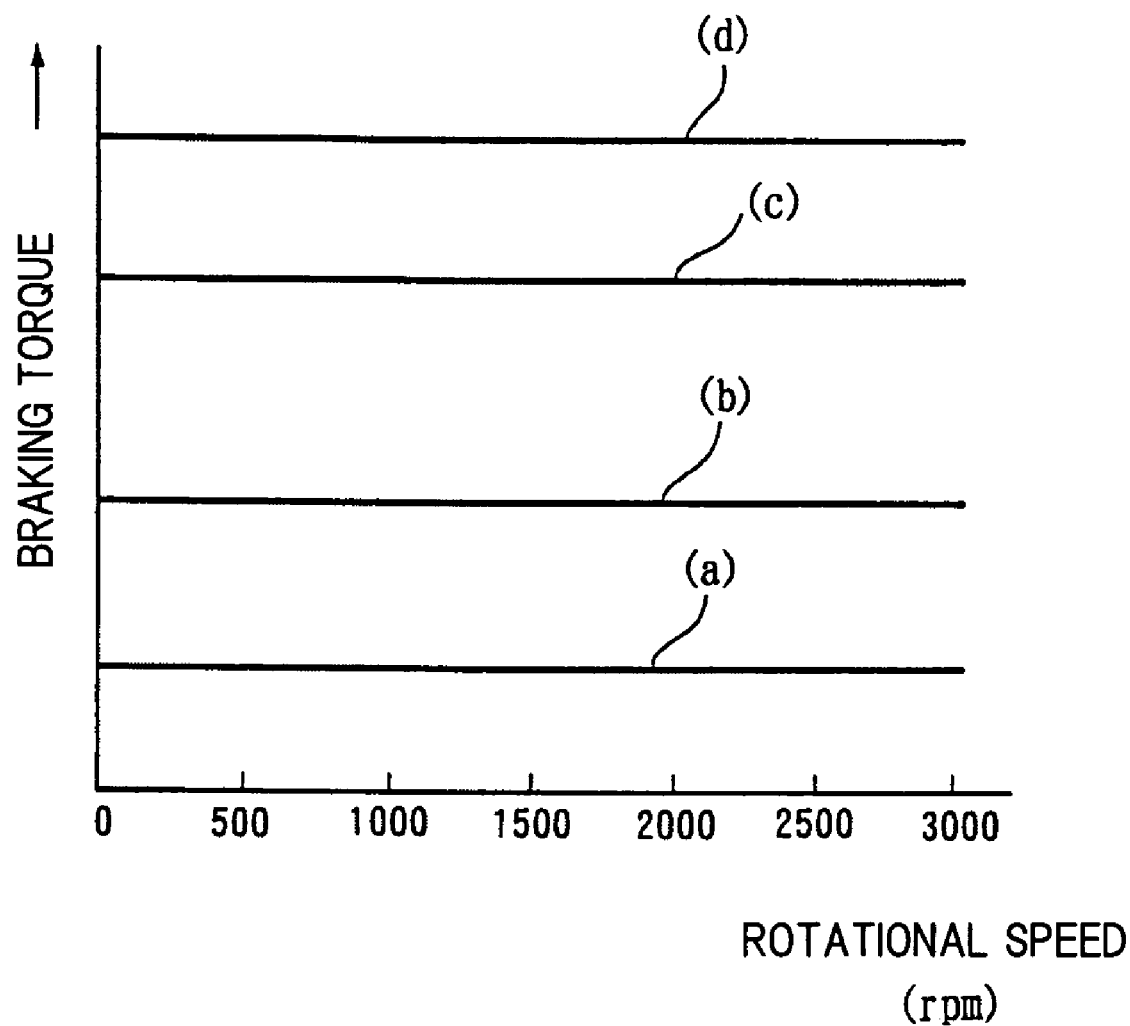
FIG. 11 is a graph showing a relationship between an engine rotational speed and a braking torque of the VTC.

Note that FIG. 11 is a test result in which a relationship between a rotational speed and a braking torque in hysteresis brake 520 is examined while changing an exciting current from a to d (a<b<c<d). As is clear from the test result, in accordance with hysteresis brake 520, a braking force which always corresponds to an exciting current can be obtained without any effect of a rotational speed.

Figure 12:
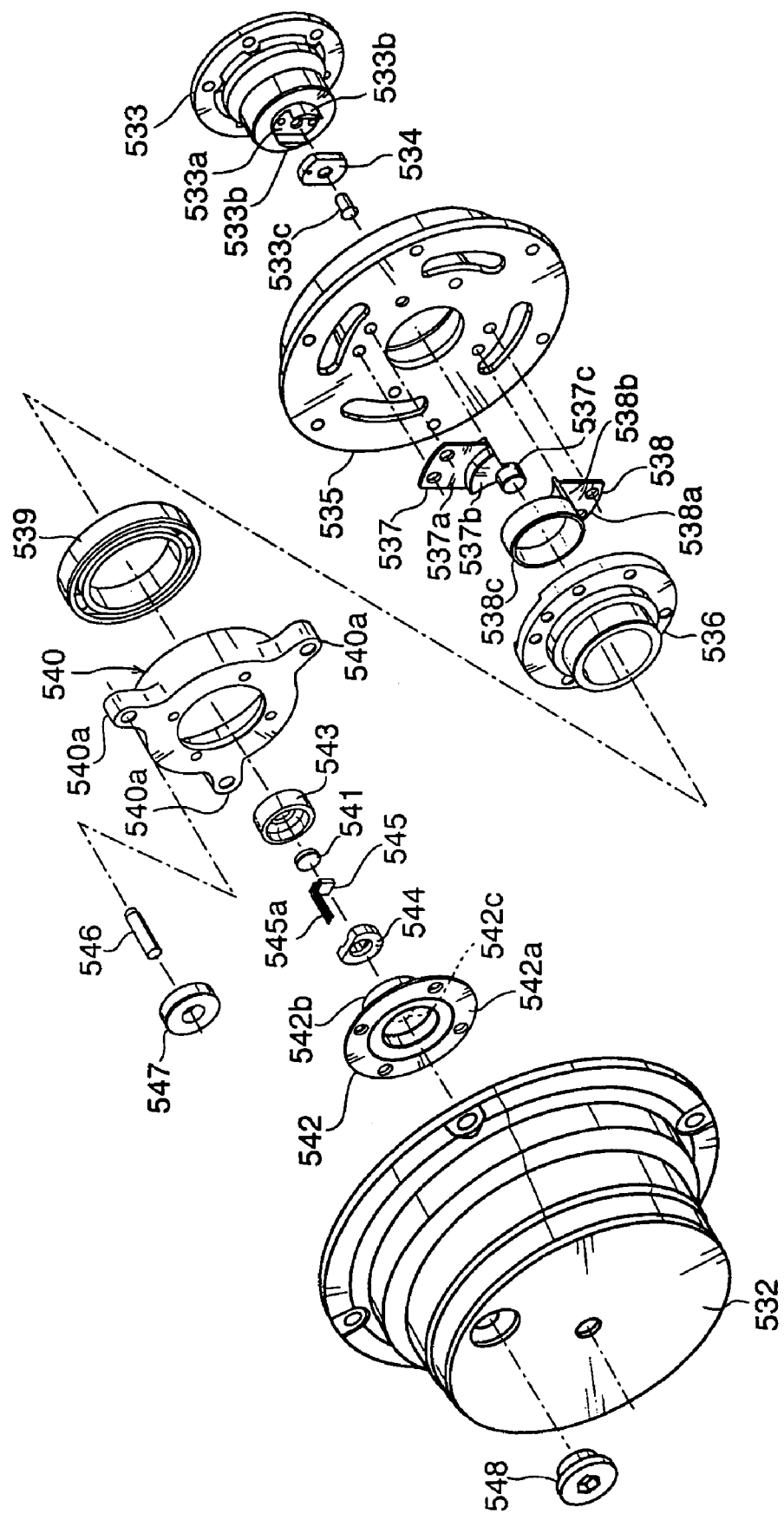
FIG. 12 is an exploded perspective view showing relative displacement detecting means of the VTC.
Figure 13:
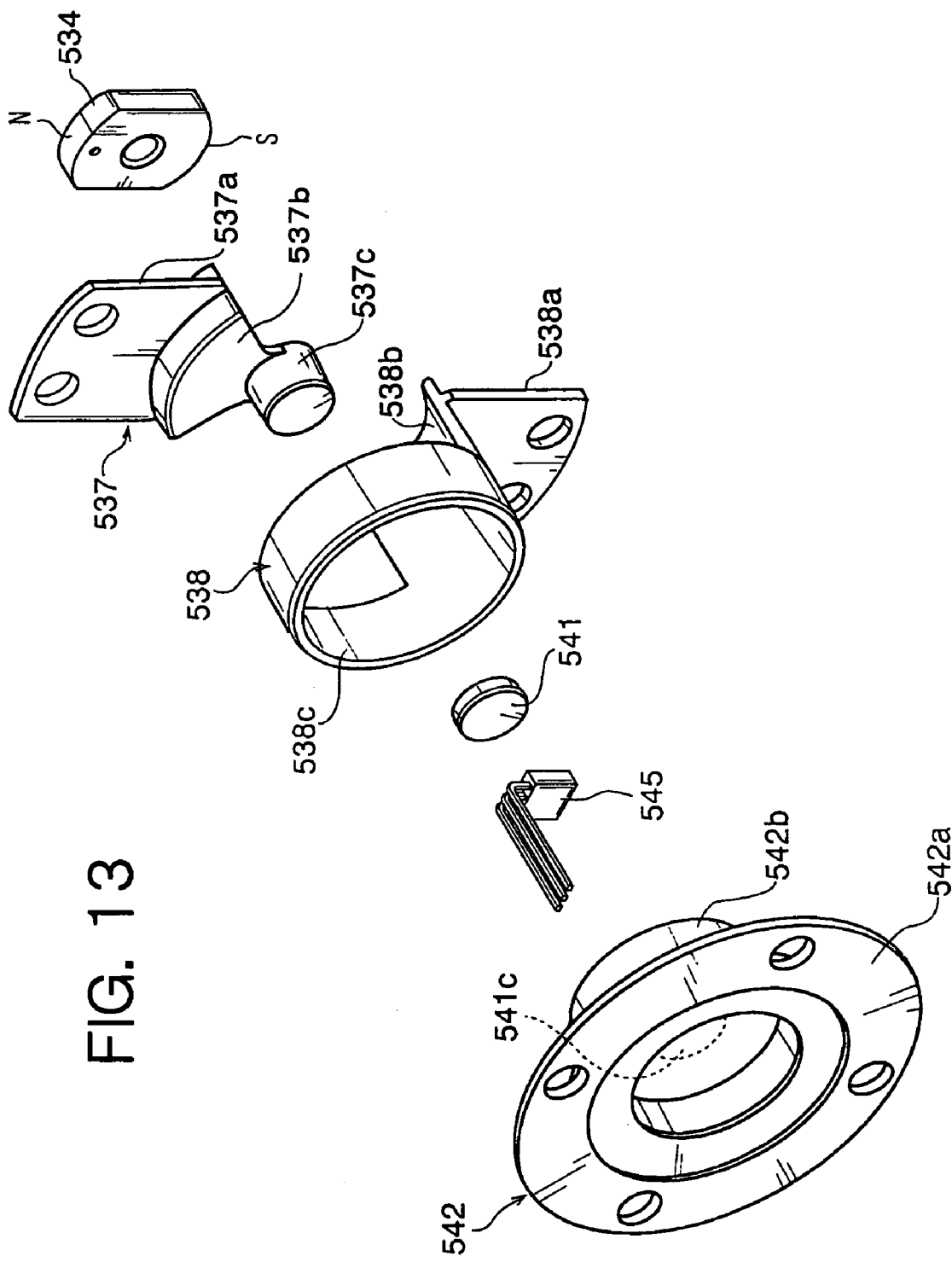
FIG. 13 is elements on large scale of FIG. 12.

As shown in FIG. 2, FIG. 12, and FIG. 13, relative displacement detecting means 506 is structured from a magnetic field generating mechanism provided at the side of driven shaft member 507, and a sensor mechanism which is provided at the side of VTC cover 532 which is the fixing unit side, and which detects a variation in a magnetic field from the magnetic field generating mechanism.

The magnetic field generating mechanism has a magnet base 533 formed from a non-magnetic material fixed at the front end side of flange 507a of driven shaft member 507, a permanent magnet 534 which is accommodated in a groove 533a formed at the top end portion of magnet base 533, and which is fixed by a pin 533c, a sensor base 535 fixed at the top end edge of cylinder portion 502b of timing sprocket 502, and first and second yoke members 537 and 538 which are fixed at the front end surface of sensor base 535 via a cylindrical yoke holder 536.

A seal member 551 preventing dirt and the like from entering the sensor mechanism is set between the outer peripheral surface of magnet base 533 and the inner peripheral surface of sensor base 535.

As shown in FIG. 12, magnet base 533 has a set of protruded walls 533b and 533b forming groove 533a whose top and bottom are opened, and permanent magnet 534 is accommodated between both protruded walls 533b and 533b.

Permanent magnet 534 is formed in an oval so as to correspond to the shape of groove 533a, and the center of the top end portion and the center of the bottom end portion are respectively set to the centers of the north pole and the south pole.

As shown in FIG. 12 and FIG. 13, first yoke member 537 is structured from a plate shaped base portion 537a fixed to sensor base 535, a fan shaped yoke portion 537b provided so as to be integrated with the inner peripheral edge of the base portion 537a, and a cylindrical central yoke portion 537c provided so as to be integrated with a main portion of fan shaped yoke portion 537b. The rear end surface of central yoke portion 537c is disposed at the front surface of permanent magnet 534.

Second yoke member 538 is structured from a plate shaped base portion 538a fixed to sensor base 535, a plate shaped circular arc yoke portion 538b provided so as to be integrated with the upper end edge of base portion 538a, and a ring yoke portion 538c provided so as to be integrated with the rear end portion of circular arc yoke portion 538b in a same curvature.

Ring yoke portion 538c is disposed so as to surround the outer peripheral side of a fourth yoke member 542 which will be described later.

The sensor mechanism has a ring shaped element holder 540, a third yoke member 541 serving as a rectifying yoke, a bottled cylinder shaped fourth yoke member 542 serving as a rectifying yoke, a synthetic resin protective cap 543, a protective member 544, and a Hall element 545.

Element holder 540 is disposed at the inside of VTC cover 532, and supports the front end portion of yoke holder 536 so as to be freely rotatable via ball bearing 539 fixed by being fitted into or the like. Further, as shown in FIG. 12, three protruding portions 540a are integrally provided at uniform intervals in the circumferential direction, and ends of pins 546 are respectively fixed to be press-fitted into fixing holes provided by drilling respective protruding portions 540a.

Further, the outer ring of ball bearing 539 is urged in the direction of camshaft 134 due to a spring force of a coil spring 549 set between the inner surface of VTC cover 532 and fourth yoke member 542, and in accordance therewith, positioning in the axis direction is carried out, and generation of looseness is prevented.

Further, three of holes 532a are formed at uniform intervals in the circumferential direction at the inner side of VTC cover 532, and rubber bushes 547 are respectively fixed to the insides of holes 532a. The other end portions of pins 546 are inserted into the holes drilled at the centers of respective rubber bushes 547, and in accordance therewith, element holder 540 is supported at VTC cover 532. Note that a stopper body 548 choking the openings at the outer sides of respective holding holes 506a is screwed up on VTC cover 532.

Third yoke member 541 is formed in a substantially disk type, and is disposed so as to face central yoke portion 537c of first yoke member 537 via an air gap G of a predetermined amount (about 1 mm).

An air gap G1 is formed between the inner peripheral surface of ring yoke portion 538c of second yoke member 538 and an outer peripheral surface of cylinder portion 542b of fourth yoke member 542.

Fourth yoke member 542 is fixed to the inner periphery of element holder 540 by a bolt and the like, and has a disk type base portion 542a fixed to element holder 540, a small-diameter cylinder portion 542b which is provided so as to be integrated with the side end surface of Hall element 545 of base portion 542a, and a protrusion 542c provided at the bottom wall surrounded by cylinder portion 542b. Protrusion 542c is disposed coaxially with permanent magnet 534, central yoke member 537c of first yoke member 537, and third yoke member 541.

Protective cap 543 is fixed to the inner peripheral surface of the cylinder portion 542b of fourth yoke member 542, and supports third yoke member 541.

Protective member 544 is fitted into to be attached to the outer periphery of a cylindrical protrusion 542c provided so as to be integrated with the center of the bottom wall of fourth yoke member 542.

Hall element 545 is maintained between third yoke member 541 and protrusion 542c of fourth yoke member 542, and a lead wire 545a thereof is connected to ECU 114.

VTC 113 is structured as described above, and during the time of rotating the engine (for example, during idling-driving before stopping), due to the excitation of electromagnetic coil 524 of hysteresis brake 520 being turned off, intermediate rotator 518 is made to rotate at the maximum in the direction in which engine is rotated with respect to timing sprocket 502 by the force of power spring 519 (refer to FIG. 3).

In accordance therewith, a rotational phase of camshaft 134 with respect to crankshaft 120 is maintained at the maximum retard side in which a valve timing of intake valve 105 is retarded at the maximum (the maximum retard timing).

When an instruction to vary the rotational phase to the maximum retard side from this state is ordered, the excitation of electromagnetic coil 524 of hysteresis brake 520 is turned on, braking force against the force of spiral spring 519 is applied to intermediate rotator 518. In accordance therewith, intermediate rotator 518 is moved to rotate with respect to timing sprocket 502, and in accordance therewith, engagement pins 516 at the top ends of links 511 are led to spiral slot 515, and the top end portions of links 511 are displaced along groove 508 in the radial direction, and as shown in FIG. 5, an assembling angle between timing sprocket 502 and driven shaft member 307 is varied to be at the maximum advance side due to the effects of links 511. As a result, the rotational phase is at the maximum advance side in which the valve timing of intake valve 105 is advanced at the maximum (the maximum advance timing).

Moreover, when an instruction that the rotational phase is varied from this state (the maximum advance side) to the maximum retard side is ordered from ECU 114, the excitation of electromagnetic coil 524 of hysteresis brake 520 is turned off, and intermediate rotator 518 is moved to rotate in the direction of returning by the force of spiral spring 319 again. Then, links 311 swing in the direction opposite to the direction described above due to engagement pins 316 being led by spiral slot 315, and as shown in FIG. 3, an assembling angle between timing sprocket 302 and driven shaft member 307 is varied to be at the maximum advance side due to the effects of links 311.

The rotational phase (of camshaft 134 with respect to the crank shaft) varied by VTC 113 can be varied to be, not only two types of phases at the maximum retard side and the maximum advance side described above, but also an arbitrary phase such as, for example, an intermediate advance state shown in FIG. 4, by the control of the braking force of hysteresis brake 520, and the phase can be maintained by the balance of the force of power spring 519 and the braking force of hysteresis brake 520.

Note that the excitation of electromagnetic coil 524 of hysteresis brake 520 is turned off during the time of stopping the engine. However, friction is strong during the time of stopping the engine, and because a stronger force is required in order to rotate intermediate rotator 518, intermediate rotator 518 cannot be rotated to the retard side (in the returning direction) only by the force of power spring 519 as that during the time of rotating the engine. Therefore, the valve timing controlled directly before stopping is maintained substantially as it is.

Further, detection of a relative displacement angle (rotational phase) by relative displacement detecting means 506 is carried out as follows. Note that FIG. 14 schematically shows relative displacement detecting means 506.

Figure 14:
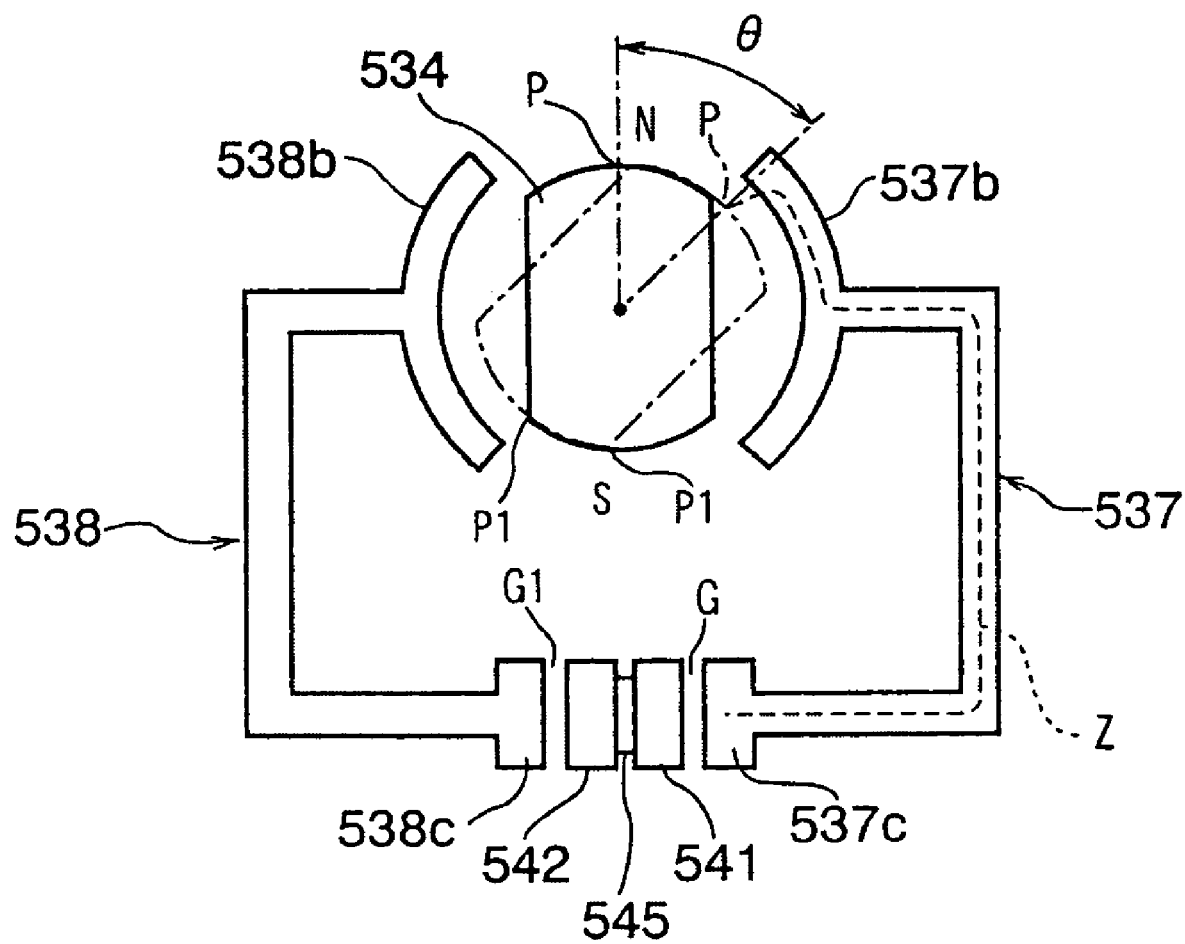
FIG. 14 is a diagram schematically showing the relative displacement detecting means of the VTC.

As shown in FIG. 14, a relative rotational phase between camshaft 134 and timing sprocket 502 is varied, and when permanent magnet 534 of relative displacement detecting means 506 is rotated, for example, by an angle of θ, a magnetic field Z outputted from the center P of the north pole is transmitted to fan shaped yoke portion 537b of first yoke member 537, and is transmitted to central yoke member 537c, and moreover, magnetic field Z is transmitted to Hall element 545 through third yoke member 541 via air gap G.

Magnetic field Z which has been transmitted to Hall element 545 is transmitted to cylinder portion 542b of fourth yoke member 542 via protrusion 542c of fourth yoke member 542 from Hall element 545, and is further transmitted to ring yoke portion 538c of second yoke member 538 via air gap G1, and is returned to the south pole of permanent magnet 534 via circular arc yoke portion 538b.

Because the magnetic flux density of magnetic field Z is sequentially varied due to rotational angle θ of permanent magnet 534 being sequentially varied, the sequential variation in the magnetic flux density is detected by Hall element 545, and a variation in the voltages thereof is outputted to ECU 114.

Accordingly, at ECU 114, a relative rotational displacement angle (an advance value of a rotational phase) of camshaft 134 with respect to crankshaft 120 can be sequentially found in an arbitrary timing by a computation on the basis of the sequential detection signals (variations in voltage) outputted from Hall element 545 via lead wire 545a.

Namely, ECU 114 in the present embodiment can detect a rotational phase (a valve timing of intake valve 105) of intake side camshaft 134 with respect to crank shaft 120 at each rotational period of intake side camshaft 134 on the basis of output signals of crank angle sensor 117 and cam sensor 132 (first rotational phase detecting means), and can sequentially detect the rotational phase in arbitrary timings on the basis of an output signal of Hall element 545 (second rotational phase detecting means).

To describe concretely, the first rotational phase detecting means detects (calculates) the rotational phase by counting unit angle signals POS from the time when a reference crank angle signal REF is generated up to the time when a cam signal CAM is generated. On the other hand, the second rotational phase detecting means detects (calculates) the rotational phase on the basis of a sequential variation in the magnetic flux density of magnetic field Z detected by Hall element 545.

In this way, due to the two rotational phase detecting means being provided, for example, at the time of high rotational speed, the rotational phase of intake side camshaft 134 with respect to crankshaft 120 is stably and accurately detected by the first rotational phase detecting means, and at the time of low rotational speed in which a detection period of the rotational phase by the first rotational phase detecting means is made longer than an execution period of valve timing control and the like, a rotational phase is detected by the second rotational phase detecting means. In accordance therewith, deterioration in the controllability can be prevented.

By the way, in the present embodiment, a valve timing of intake valve 105 at the time of starting the engine (starting time timing) is set at a further advance side than the maximum retard timing. This is because an attempt is made to improve outputting due to the valve timing being set to be retard at the time of high rotational speed while controlling the valve timing to be an opening-and-closing timing in which the starting performance is not deteriorated at the time of starting the engine.

Therefore, ECU 114 detects an actual valve timing (actual rotational phase) by the second rotational phase detecting means in the process of cranking the engine, i.e., when a starting motor is turned on by an operation of a key switch (ignition switch), and controls VTC 113 such that the actual valve timing is made to agree with the starting time timing (controls energizing of electromagnetic coil 524 of hysteresis brake 520).

Here, VTC 113 in the present embodiment has a structure in which a valve timing is varied by a braking force of an electromagnetic brake, and because VTC 113 can be operated at substantially the same time when a manipulated variable is outputted to VTC 113 (energizing of electromagnetic coil 524), it can be said that the responsiveness thereof is more outstanding than that of a hydraulic VTC at the time of starting the engine as well. However, in the present embodiment (first embodiment), the following valve timing control is executed so as to improve the starting performance by further improving the responsiveness.

Figure 15:
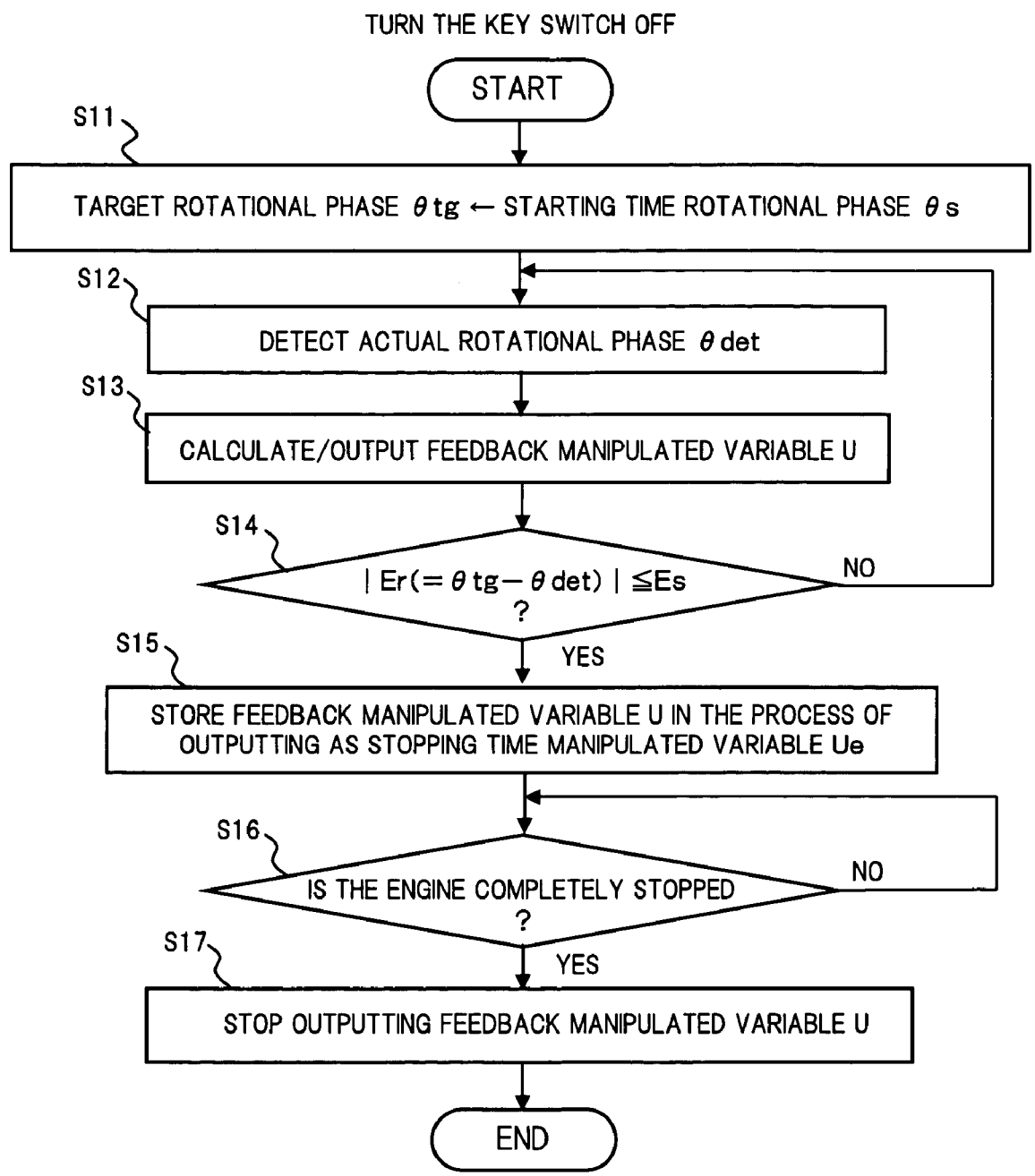
FIG. 15 is a flowchart of valve timing control at the time of stopping the engine relating to the embodiment.

FIG. 15 is a flowchart showing valve timing control at the time of stopping the engine. This flow is started when a request to stop the engine is detected (for example, when the key switch is turned off).

At S11, the starting time timing (starting time rotational phase) θs is set to a target valve timing (target rotational phase) θtg (θtg←θs).

At S12, an actual valve timing (actual rotational phase) θdet of intake valve 105 is detected. Such a detection is carried out on the basis of an output signal from Hall element 545, i.e., by the second rotational phase detecting means.

At S13, for example, on the basis of a deviation Er between the target rotational phase θtg and the actual rotational phase θdet, a feedback manipulated variable of VTC 113 (an amount of energizing of electromagnetic coil 324) U is calculated by the following formula, and a duty control signal based on the feedback manipulated variable is outputted.

$$U=Up+Ui+Ud$$

$$Up=Gp*Er$$

$$Ui=Gi*Er*Ts+Uiz$$

$$Ud=Gd*(Er-Erz)/Ts$$

Provided that, Up: proportional manipulated variable (proportional paragraph), Ui: integrated manipulated variable (integrated paragraph), Ud: differential manipulated variable (differential paragraph), Gp: proportional gain, Gi: integrated gain, Gd: differential gain, Ts: control period, Uiz: previous value of integrated manipulated variable, and Erz: previous value of deviation.

At S14, it is judged whether or not an actual rotational phase θdet is converged into the target rotational phase θtg. Such a judgment is carried out in accordance with, for example, whether or not an absolute value of the deviation Er is set to be less than or equal to a predetermined value Es.

Then, when the actual rotational phase θdet is converged into the target rotational phase θtg, the routine proceeds to S15, and when the actual rotational phase θdet is not converged into the target rotational phase θtg, the routine returns to S12, and the feedback-control is continued.

At S15, a feedback manipulated variable U during the time of outputting, i.e., in a state in which the actual rotational phase θdet is converged into the target rotational phase θtg is stored as a stopping time manipulated variation Ue (Ue←U).

Then, at S16, it is judged whether or not the engine is completely stopped, and when the engine has been completely stopped, the routine proceeds to S17, and outputting of the feedback manipulated variable U (energizing to electromagnetic coil 324) is stopped, and this flow is completed. In accordance therewith, the starting time timing is substantially maintained during the time of stopping the engine.

Figure 16:
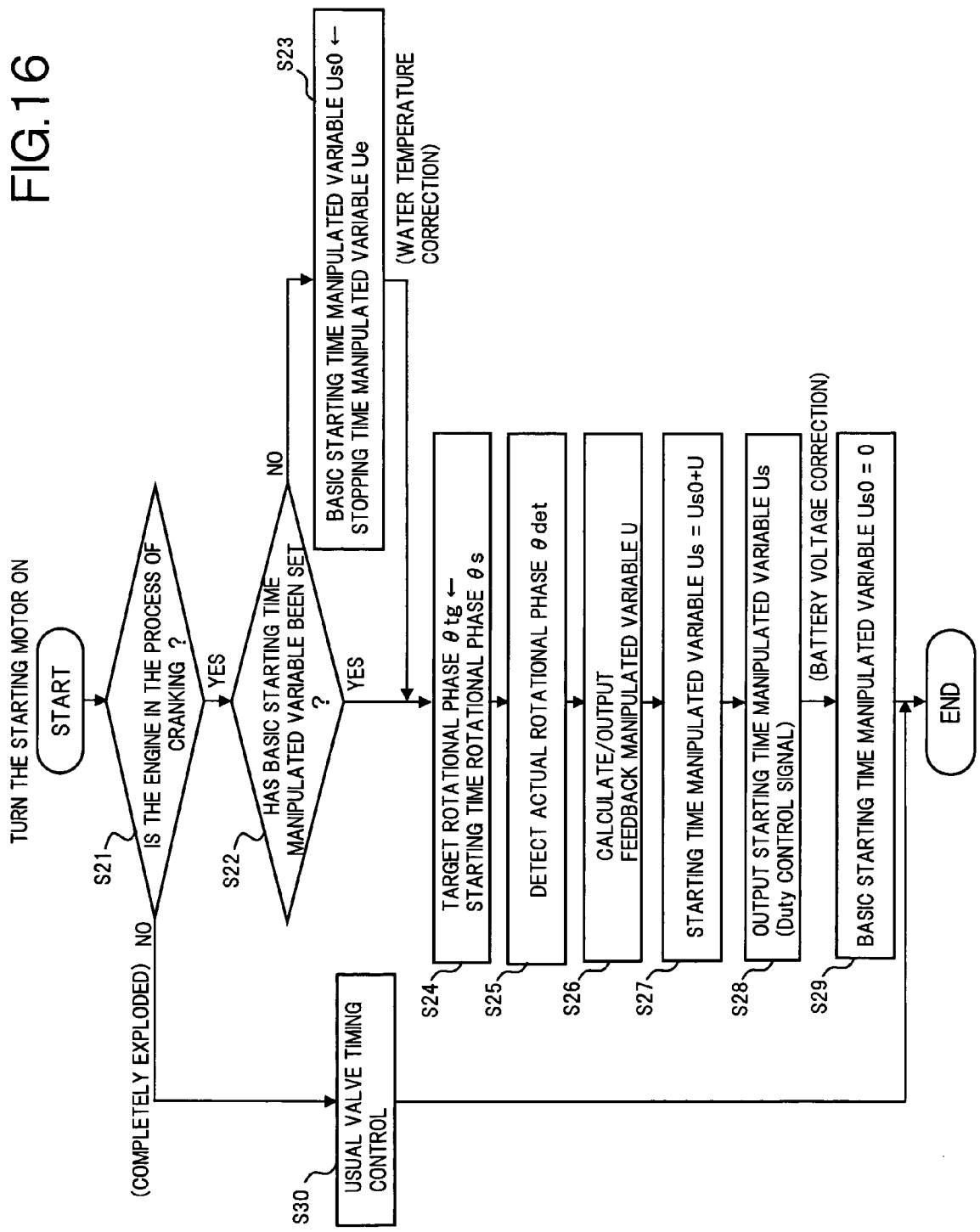
FIG. 16 is a flowchart of valve timing control at the time of starting the engine relating to the embodiment.

FIG. 16 is a flowchart of valve timing control at the time of starting the engine (starting time valve timing control). This flow is started when a request to start the engine is detected (for example, when the starting motor is turned on), and is executed at predetermined times.

At S21, it is judged whether or not the engine is in the process of cranking (whether or not the engine is not completely exploded). Such a judgment is carried out on the basis of, for example, variations in an output signal of pressure sensor 135 and an engine rotational speed Ne. When the engine is in the process of cranking (the engine has not been completely exploded), the routine proceeds to S22. On the other hand, when the cranking is completed (the engine has been completely exploded), the routine proceeds to S30, and the operation is transferred to usual valve timing control (feedback-control).

At S22, it is judged whether or not a basic starting time manipulated variable Us0 has been already set. When the basic starting time manipulated variable Us0 has been already set, the routine proceeds to S24, and when the basic starting time manipulated variable Us0 has not been set yet, the routine proceeds to S23.

At S23, the stopping time manipulated variable Ue stored at the previous time of stopping is read, and is set to a basic starting time manipulated variable Us0 outputted when a request to start the engine is detected (Us0←Ue). Note that the starting time manipulated variable Us is preferably set so as to be corrected in accordance with an engine temperature at the time of starting (a cooling water temperature Tw). This is because a coil current value of electromagnetic coil 524 varies in accordance with a coil temperature (the higher the coil temperature is, the further the coil current is reduced), and a cam torque varies in accordance with a hydraulic fluid temperature. Such a water temperature correction is carried out, for example, by determining a water temperature correction factor on the basis of a cooling water temperature Tw at the time of starting by looking up a table set in advance, or the like, and by multiplying the basic starting time manipulated variable Us0 by the water temperature correction factor.

At S24 to S26, the operations are in the same way as those at S11 to S13 in FIG. 15, and the starting time timing (starting time rotational phase) θs is set to a target valve timing (target rotational phase) θtg, and an actual valve timing (actual rotational phase) θdet of intake valve 105 is detected, and a feedback manipulated variable U of VTC 113 is calculated on the basis of the deviation Er therebetween. Note that the detection of the actual rotational phase θdet is carried out by the second rotational phase detecting means.

At S27, a starting time manipulated variable Us is calculated by adding the feedback manipulated variable U calculated at S26 to the basic starting time manipulated variable Us0 (or a basic starting time manipulated variable after a water temperature correction) set at S23.

At S28, a duty control signal based on the calculated starting time manipulated variable Us is outputted to electromagnetic coil 324. At that time, it is preferable to correct on the basis of a battery voltage Vb. This is because, a great power consumption is required in order to drive the starting motor in the process of cranking, and a battery voltage Vd is further reduced than other states including a state at the time of stopping the engine. Such a correction in a battery voltage is carried out simply, for example, as in the following formula.

Output duty value=(starting time manipulated variable Us (Voltage)/battery voltage $Vd$)×100(%).

Then, at S29, The basic starting time manipulated variable Us0 is reset (is made to be Us0=0), and this flow is completed.

In accordance therewith, when a request to start the engine is detected, a manipulated variable when the valve timing is converged into the starting time timing at the previous time of stopping the engine (stopping time manipulated variable Ue) is set to the basic starting time manipulated variable Us0 as a feedforward manipulated variable, and VTC 113 is driven immediately by a staring time manipulated variable Us in which the basic starting time manipulated variable Us0 and the feedback manipulated variable U are added (thereafter, feedback control is carried out continuously).

At that time, because the valve timing is made close to the starting time timing by the above-described control at the time of stopping the engine (FIG. 15), the valve timing can be rapidly controlled to be the starting time valve timing.

Figure 17:
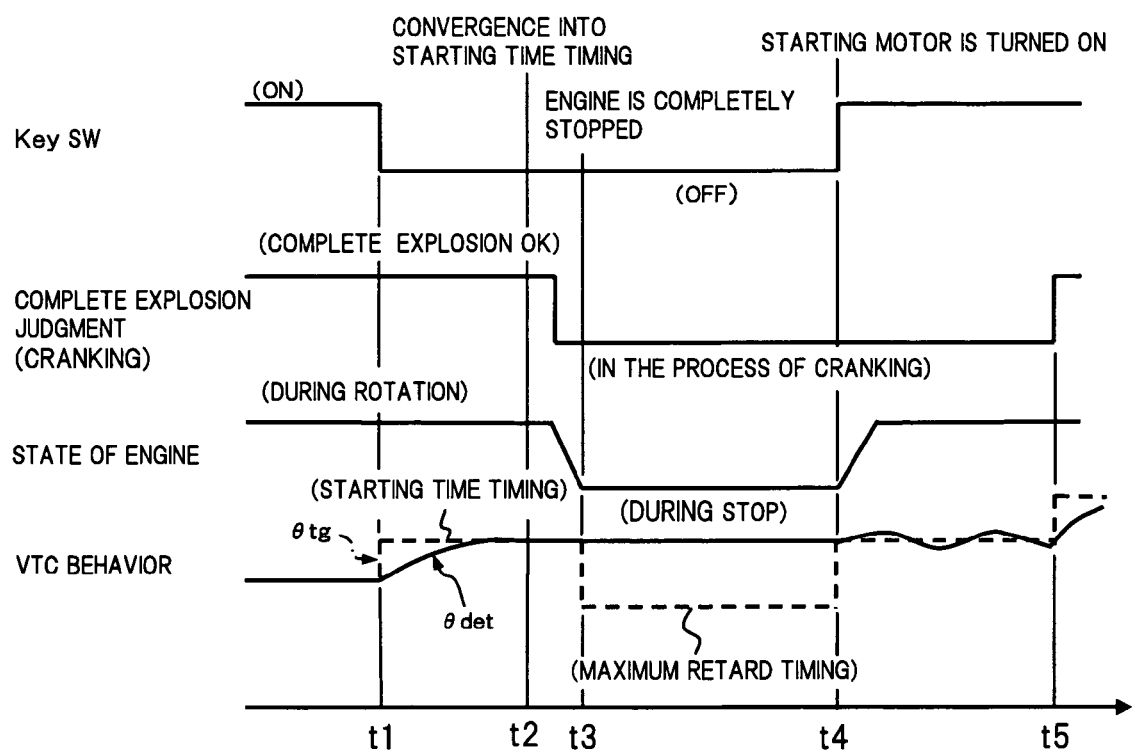
FIG. 17 is a time chart at the time of stopping and at the time of starting the engine.

FIG. 17 is a time chart showing variations at the time of stopping and at the time of starting the engine in the present embodiment (first embodiment).

When the key switch is turned off, a target valve timing (broken-line) is set as the starting time valve timing (time t1). In accordance therewith, VTC 113 is controlled such that an actual valve timing (full line) is made to agree with the starting time valve timing. Then, a manipulated available of VTC 113 when the actual valve timing is made to agree with (converged into) the starting time valve timing is stored (time t2), and thereafter, the engine is stopped (time t3). Here, because outputting of the feedback manipulated variable to VTC 113 is stopped after confirming that the engine has been stopped, VTC 113 maintains the starting time valve timing continuously during the time of stopping the engine.

On the other hand, when the starting motor is turned on by a key switch operation (ON), a target valve timing is set as the starting time valve timing, and the stopping time manipulated variable Ue stored at the previous stopping time is set as a basic starting time manipulated variable (feedforward manipulated variable) Us0, and a starting time manipulated variable Us in which the basic starting time manipulated variable Us0 and the feedback manipulated variable U are added is outputted to VTC 113 (time t4). In accordance therewith, at the time of starting, the control is started from around the stopping time valve timing, and moreover, the stopping time manipulated variable Ue stored first is outputted to VTC 113 as the starting time manipulated variable Us, and thereafter, because feedback control is carried out such that an actual valve timing is made to agree with the starting time timing, the valve timing is rapidly converged into the starting time valve timing. When cranking is completed (the engine is completely exploded), the operation is transferred from the starting time valve timing control to the usual valve timing control (time t5).

As described above, in the present embodiment, the valve timing of intake valve 105 is controlled to be a starting time timing appropriate for starting the engine at the time of stopping the engine (when a request to stop the engine is detected), and the manipulated variable outputted to VTC 113 in a state in which the valve timing has been converged into the starting time timing is stored as a stopping time manipulated variable, and after the engine is completely stopped, outputting of the manipulated variable to VTC 113 is stopped. Then, at the time of starting the engine (when a request to start the engine is detected), a starting time manipulated variable to be outputted to VTC 113 is set on the basis of the stored stopping time manipulated variable.

Accordingly, at the time of starting the engine, the valve timing can be rapidly controlled to be a starting time timing which is at a further advance side than the maximum retard timing, and the situation that initial explosion is brought about by carrying out fuel injection and ignition before the valve timing reaches the starting time timing is avoided, and deterioration in emission and combustive instability can be prevented. Note that provided that the above-described valve timing control at the time of stopping the engine (FIG. 15) is carried out, the valve timing control at the time of starting the engine may be a usual valve timing control (feedback control).

Further, in the flow of FIG. 16, this basic starting time manipulated variable Us0 is outputted immediately after the basic starting time manipulated variable Us0 is set at S23, and thereafter, the feedback control may be carried out.

Moreover, as VTC 113 in the present embodiment, VTC 113 having a structure in which the valve timing directly before stopping is maintained during the time of stopping the engine is used. However, the present embodiment may be applied to VTC 113 having a structure in which the valve timing directly before stopping is not maintained during the time of stopping the engine (for example, a structure in which, when energizing to an actuator is stopped, the valve timing is made to be the maximum retard timing). In this case as well, because at least the stopping time manipulated variable Ue is outputted to VTC 113 at the same time of starting the engine, as compared with the conventional art, the convergence into the starting time valve timing can be advanced.

Furthermore, in the flow of FIG. 16, the basic starting time manipulated variable Us0 is set only at the initial first time after the starting motor is turned on, and is added to the feedback manipulated variable U. However, the basic starting time manipulated variable Us0 may be added plural times in accordance with the characteristic of VTC 113, and the basic starting time manipulated variable Us0 may be gradually reduced each time of repeating addition. In accordance therewith, it is particularly effective in the case in which the present embodiment is applied to a structure in which the valve timing directly before stopping is not maintained during the time of stopping the engine.

Next, valve timing control relating to another embodiment (a second embodiment) will be described. In the present embodiment, a manipulated variable by which the starting time valve timing can be maintained is determined in advance in accordance with a state at the time of starting (for example, a cooling water temperature Tw), and is made into a table. Further, when a request to start the engine is detected, a manipulated variable is set as a starting time manipulated variable (feedforward manipulated variable) by looking up the table (the control at the time of stopping the engine is the same as that of FIG. 15).

Figure 18:
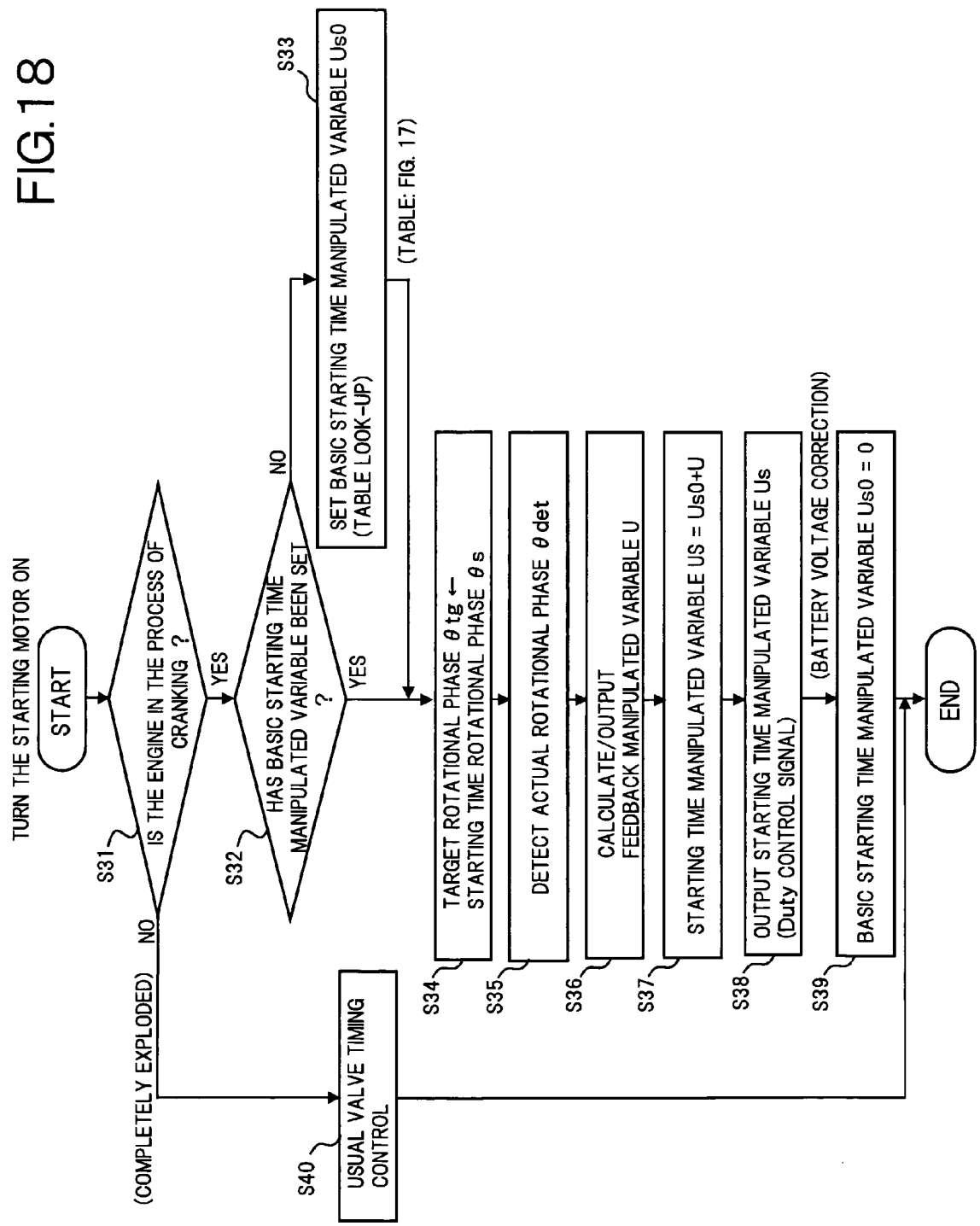
FIG. 18 is a flowchart of valve timing control at the time of starting the engine relating to another embodiment.

FIG. 18 is a flowchart of valve timing control at the time of starting the engine relating to the second embodiment. This flow as well is, in the same way as that of FIG. 16, started when a request to start the engine is detected, and is executed at predetermined times.

Because S31, S32, and S34 to S40 are the same as S21, S22, and S24 to S30 of FIG. 16 described above, descriptions thereof here will be omitted.

At S32, when the basic starting time manipulated variable Us0 has not been set yet, the routine proceeds to S33.

Figure 19:
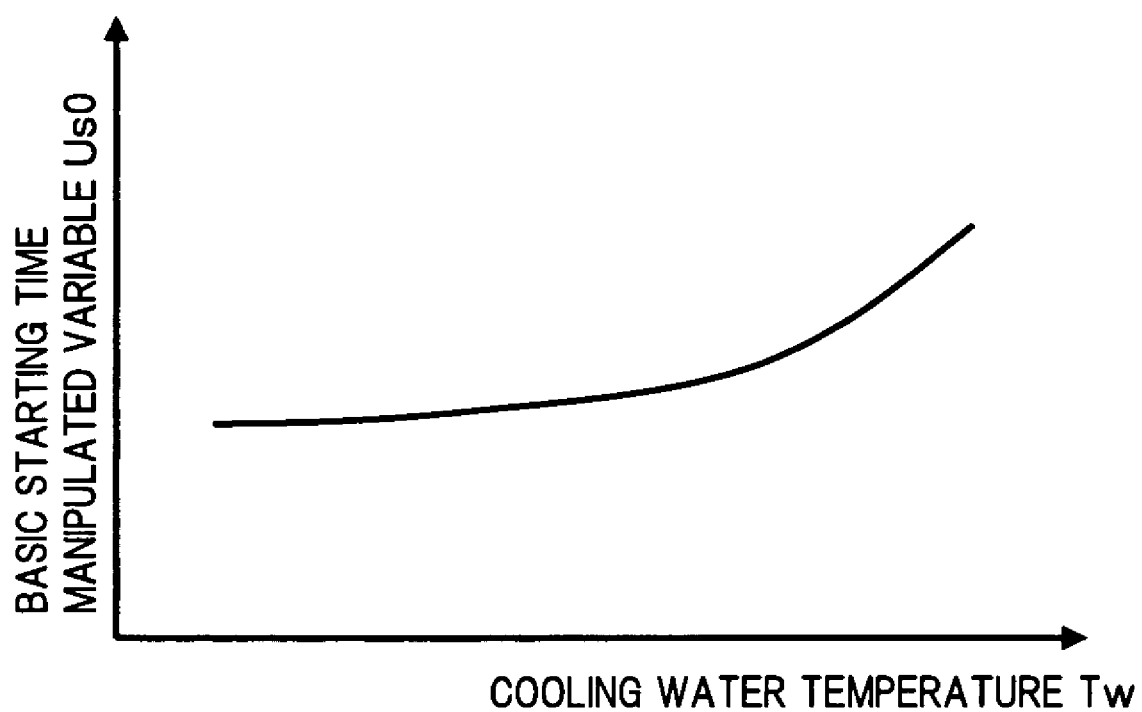
FIG. 19 is an example of a table for setting a (basic) starting time manipulated variable in accordance with an engine temperature.

At S33, a basic starting time manipulated variable Us0 is set by looking up a table set in advance (refer to FIG. 19) on the basis of a cooling water temperature Tw at the time of starting. The reason for that the basic starting time manipulated variable Us0 is set on the basis of the cooling water temperature Tw is in the same way as the reason for that the above-described water temperature correction (refer to S23 of FIG. 16) is carried out.

In the present embodiment as well, this basic starting time manipulated variable Us0 may be outputted immediately after the basic starting time manipulated variable Us0 is set at S33, and the basic starting time manipulated variable Us0 may be added plural times, or the basic starting time manipulated variable Us0 may be gradually reduced each time of repeating addition.

As described above, in the present embodiment, the starting time manipulated variable Us is set as a feedforward manipulated variable in accordance with a state at the time of starting the engine (a cooling water temperature Tw or the like), and the feedforward manipulated variable Us and the feedback manipulated variable U are added and outputted to VTC 113. Alternatively, the starting time manipulated variable Us is outputted first, and thereafter, feedback control is executed such that the valve timing is made to agree with the starting time timing in the same way as a usual valve timing.

Accordingly, in the present embodiment as well, at the time of starting the engine, the control is started from around the starting time valve timing, and the valve timing can be rapidly controlled from the state to the starting time valve timing. In accordance therewith, the situation that initial explosion is brought about by carrying out fuel injection and ignition before the valve timing reaches the starting time timing is avoided, and deterioration in emission and combustive instability can be prevented.

In the same way as in the first embodiment, the present embodiment as well may be applied to a structure in which the valve timing directly before stopping is not maintained during the time of stopping the engine. In this case, because a basic starting time manipulated variable Us0 is set by looking up the table, there is no need to control the valve timing to be the starting time timing at the time of (directly before) stopping the engine.

Figure 20:
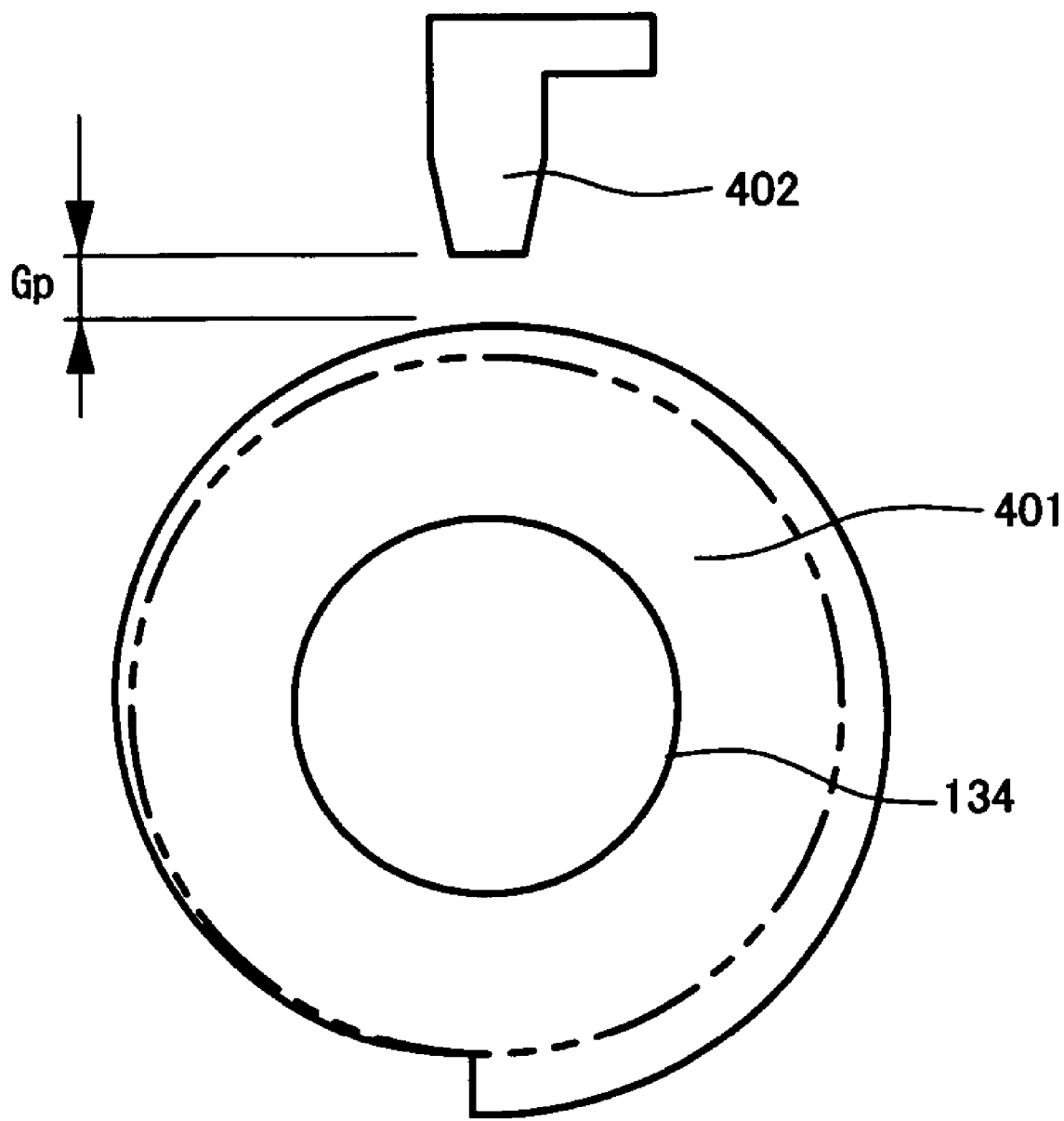
FIG. 20 is a diagram showing a rotator and a gap sensor which are a structure for detecting a rotational position of a camshaft.

In the present embodiment described above, Hall element 545 is used as the second rotational phase detecting means which sequentially detects an actual valve timing (actual rotational phase) θdet of intake valve 105 in an arbitrary timing. However, it is not limited thereto. For example, as shown in FIG. 20, a rotator 401 rotating along with camshaft 134 and an electromagnetic type gap sensor 402 disposed so as to be close to the outer periphery of rotator 401 are provided, and an actual valve timing of intake valve 105 may be sequentially detected in arbitrary timings on the basis of output signals from gap sensor 402 and crank angle sensor 117.

In this case, rotator 401 is fixed to camshaft 134 directly or indirectly via another member, and the outer periphery thereof is formed such that a distance from the center of camshaft 134 is gradually varied in the circumferential direction.

Gap sensor 402 outputs an output signal (a voltage or the like) corresponding to a gap Gp between camshaft 134 and the outer periphery of rotator 401 varying in accordance with a rotation to ECU 114.

Here, any of fixing methods, fixed positions, and the like thereof in which rotator 401 is provided so as to rotate along with camshaft 134 can be used, and any of systems thereof in which gap sensor 402 can sequentially output a signal corresponding to the gap Gp with the outer periphery of rotator 401 can be used.

Figure 21:
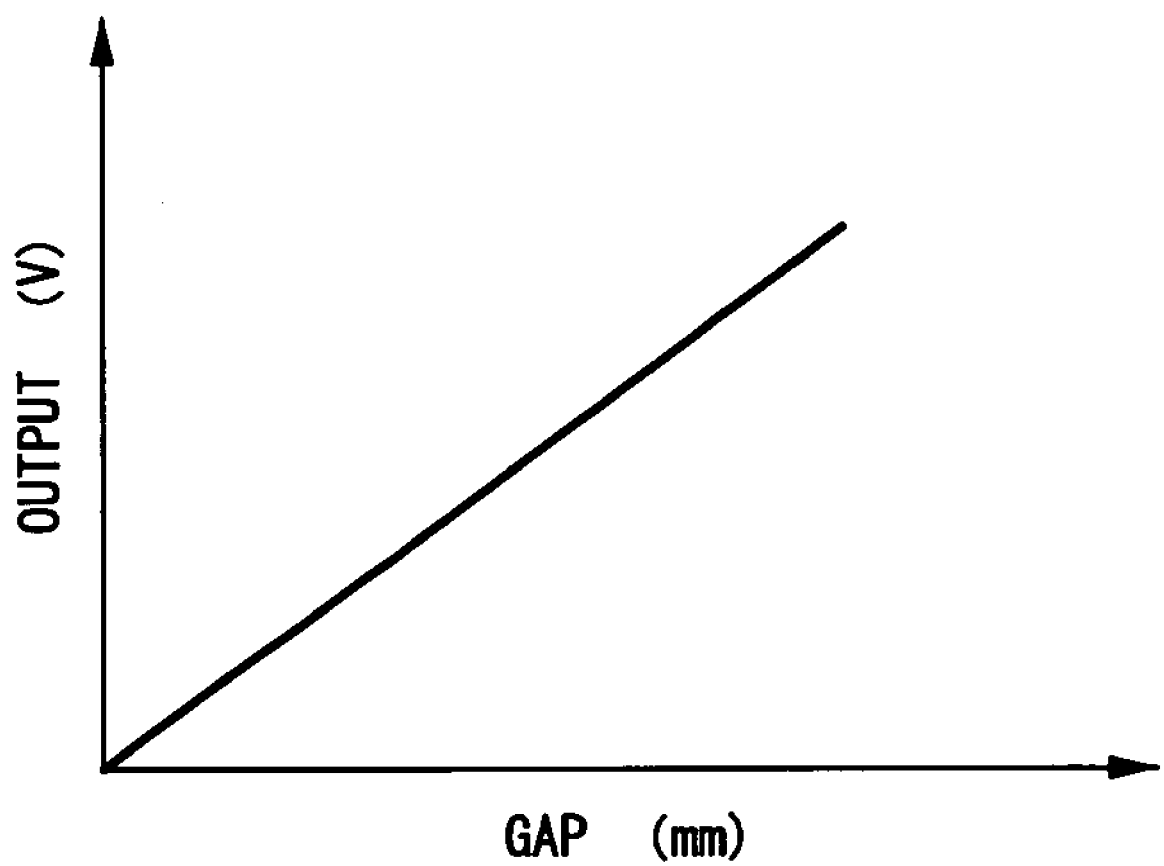
FIG. 21 is a graph showing a relationship between a gap and an output of the gap sensor.
Figure 22:
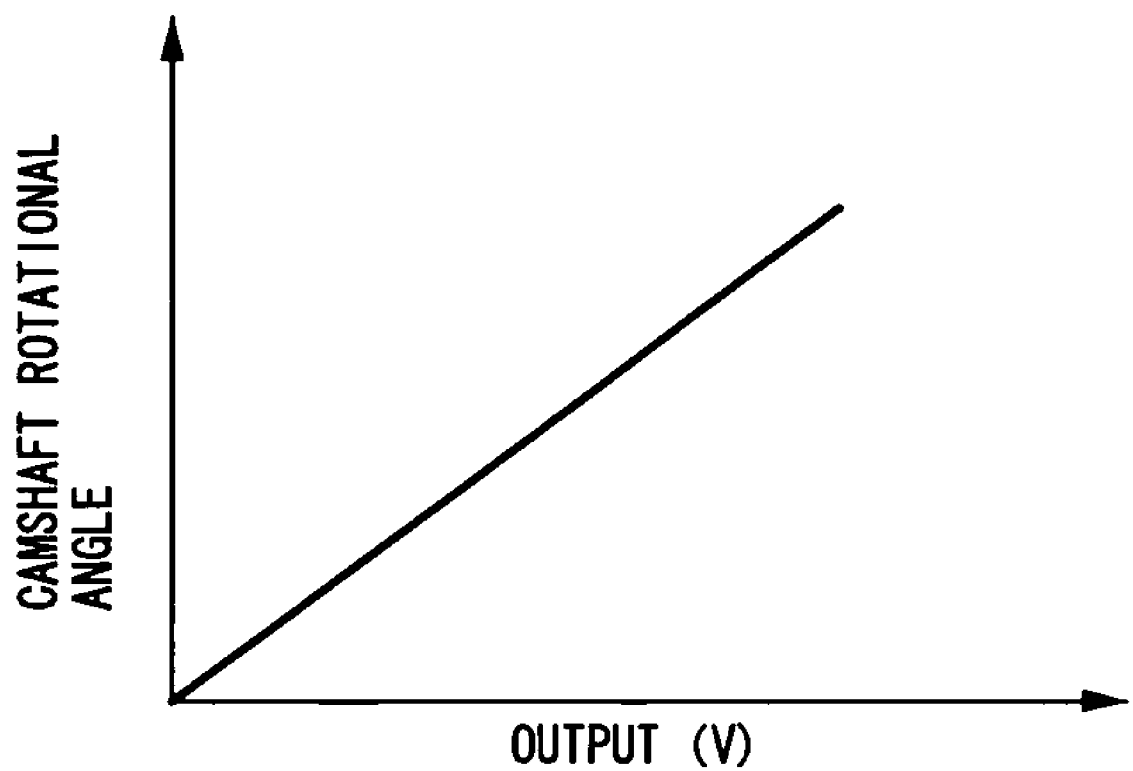
FIG. 22 is a graph showing a relationship between an output of the gap sensor and a rotational angle of the camshaft (rotator).

As shown in FIG. 21, the output from gap sensor 402 is substantially in direct proportion to the gap Gp with the outer periphery of rotator 401, and because the gap Gp and the rotational angle of camshaft 134 correspond to one another in proportion of 1:1, as shown in FIG. 22, the output from gap sensor 402 and the rotational angle of camshaft 134 are substantially in direct proportion.

Namely, ECU 114 can detect the rotational angle of camshaft 134 instantly (in an arbitrary timing) on the basis of an output signal from gap sensor 402.

On the other hand, because the rotational angle of crankshaft 120 can be detected by counting the number of generating unit angle signals POS from a reference rotational position of crankshaft 120 detected at crank angle sensor 117, the rotational phase of camshaft 134 with respect to crankshaft 120 can be detected in an arbitrary timing on the basis of the rotational angle of camshaft 134 and the rotational angle of crankshaft 120 which have been detected.

Note that it may be structured such that a rotator in which a distance from the center is gradually varied in the circumferential direction and a gap sensor are provided at the side of crankshaft 120, and a rotational phase is detected on the basis of output signals from the gap sensor and gap sensor 402 at the side of camshaft 134.

In the present embodiment described above, the apparatus in which VTC 113 is provided at the side of intake valve 105 is described. However, the present embodiment is in the same way as in a case, as well, in which VTC 113 is provided at the side of exhaust valve 107.

Further, if the rotational phase of intake side camshaft 134 with respect to the crankshaft 120 can be detected in an arbitrary timing, it is not limited to the above-described embodiments, and any apparatus which can detect a rotational phase at least at a shorter period than the rotational period of intake side camshaft 134 may be used.

Moreover, the electromagnetic VTC was described in the above descriptions, the embodiment may be applied to a hydraulic VTC.

The entire contents of basic Japanese Patent Application No. 2004-070937, filed Mar. 12, 2004, Japanese Patent Application NO. 2005-036149, filed Feb. 14, 2005, priorities of which are claimed, are incorporated herein by reference.

We claim:

1. A valve timing control apparatus for an internal combustion engine comprising:
a variable valve timing mechanism which varies an opening-and-closing timing of an intake valve and/or an exhaust valve of an engine; and a control unit which sets a target opening-and-closing timing, and which controls said variable valve timing mechanism such that said opening-and-closing timing is set to said target opening-and-closing timing, wherein said control unit, at a time of starting the engine, sets a starting time timing which is at a further advance side than a maximum retard timing in which said opening-and-closing timing is retarded at the maximum to said target opening-and-closing timing, and at a time of stopping the engine, sets said starting time timing to said target opening-and-closing timing.

2. A valve timing control apparatus for an internal combustion engine according to claim 1, wherein the control unit stores a manipulated variable outputted to said variable valve timing mechanism as a stopping time manipulated variable directly before stopping the engine, and in a state in which said opening-and-closing timing is converged into said starting time timing, and sets a starting time manipulated variable to be outputted to said variable valve timing mechanism at the time of starting the engine on the basis of said stored stopping time manipulated variable.

3. A valve timing control apparatus for an internal combustion engine according to claim 2, wherein said starting time manipulated variable is calculated by adding a feedback manipulated variable based on a deviation between said starting time timing and an actual opening-and-closing timing to said stored stopping time manipulated variable.

4. A valve timing control apparatus for an internal combustion engine according to claim 1 further comprising an opening-and-closing timing detecting unit which can detect said opening-and-closing timing in an arbitrary timing, wherein the control unit controls said variable valve timing mechanism on the basis of an opening-and-closing timing detected by said opening-and-closing timing detecting unit.

5. A valve timing control apparatus for an internal combustion engine according to claim 4, wherein said variable valve timing mechanism is a structure in which said opening-and-closing timing is made to vary by varying a rotational phase of a camshaft of said intake valve or exhaust valve with respect to a crankshaft of the engine, and said opening-and-closing timing detecting unit detects a rotational phase of said camshaft with respect to said crankshaft.

6. A valve timing control apparatus for an internal combustion engine according to claim 5, wherein said opening-and-closing timing detecting unit comprises a permanent magnet provided at one of said crankshaft and said camshaft, and a yoke member which is provided at the other of said crankshaft and said camshaft, and which is formed such that a magnetic flux density of a magnetic field from a center of a magnetic pole of said permanent magnet is varied in accordance with a relative rotation of said crankshaft and said camshaft, and detects said rotational phase on the basis of a variation in the magnetic flux density.

7. A valve timing control apparatus for an internal combustion engine according to claim 6, wherein said opening-and-closing timing detecting unit comprises a Hall element which detects a variation in the magnetic flux density.

8. A valve timing control apparatus for an internal combustion engine according to claim 5, wherein said opening-and-closing timing detecting unit comprises a first rotational angle sensor which detects a rotational angle of said crankshaft, and a second rotational angle sensor which can detect a rotational angle of said camshaft in an arbitrary timing, and detects said rotational phase on the basis of output signals from said first rotational angle sensor and said second rotational angle sensor.

9. A valve timing control apparatus for an internal combustion engine according to claim 8 further comprising a rotator which rotates along with said camshaft, and in which a distance from a center of the camshaft to an outer periphery thereof varies in a circumferential direction, wherein said second rotational angle sensor detects a rotational angle of said camshaft in accordance with a gap formed between the outer periphery of said rotator.

10. A valve timing control apparatus for an internal combustion engine comprising:

a variable valve timing mechanism which varies an opening-and-closing timing of an intake valve and/or an exhaust valve of an engine;

a temperature sensor which detects an engine temperature; and a control unit which sets a target opening-and-closing timing, and which controls said variable valve timing mechanism such that said opening-and-closing timing is made to be said target opening-and-closing timing, wherein said control unit, at a time of starting the engine, sets a starting time timing which is at a further advance side than a maximum retard timing in which said opening-and-closing timing is retarded at the maximum to said target opening-and-closing timing, and sets a starting time manipulated variable to be outputted to said variable valve timing mechanism on the basis of a manipulated variable set in advance in accordance with an engine temperature.

11. A valve timing control apparatus for an internal combustion engine comprising:

a variable valve timing mechanism which varies an opening-and-closing timing of an intake valve and/or an exhaust valve of an engine;

target opening-and-closing timing setting means, at a time of starting an engine, for setting a starting time timing which is at a further advance side than a maximum retard timing in which said opening-and-closing timing is retarded at the maximum to a target opening-and-closing timing, and at a time of stopping an engine as well, for setting said starting time timing to the target opening-and-closing timing; and driving means for driving said variable valve timing mechanism such that said opening-and-closing timing is made to be a set target opening-and-closing timing.

12. A valve timing control method for an internal combustion engine comprising the steps of:

at a time of starting the engine, controlling an opening-and-closing timing of an intake valve and/or an exhaust valve of an engine to be a starting time timing which is at a further advance side than a maximum retard timing which is retarded at the maximum; and at the time of stopping the engine as well, controlling said opening-and-closing timing to be the starting time timing.

13. A control method according to claim 12 further comprising the steps of:
storing a manipulated variable outputted to the variable valve timing mechanism varying said opening-and-closing timing as a stopping time manipulated variable in a state in which said opening-and-closing timing is converged into said starting time timing; and
setting a starting time manipulated variable to be outputted to said variable valve timing mechanism at the time of starting the engine on the basis of the stored stopping time manipulated variable.

14. A control method according to claim 13, wherein said starting time manipulated variable is calculated by adding a feedback manipulated variable based on a deviation between said starting time timing and an actual opening-and-closing timing to said stored stopping time manipulated variable.

15. A control method according to claim 12 further comprising the step of
controlling said variable valve timing mechanism on the basis of an opening-and-closing timing detected in an arbitrary timing.

16. A control method according to claim 15, wherein said variable valve timing mechanism is a structure in which said opening-and-closing timing is made to vary by varying a rotational phase of a camshaft of the intake valve or the exhaust valve with respect to a crankshaft of the engine, and
a rotational phase of said camshaft with respect to said crankshaft is detected as said opening-and-closing timing.

17. A control method according to claim 16 further comprising the step of
detecting said rotational phase on the basis of a variation in a magnetic flux density of a magnetic field from a center of a magnetic pole of a permanent magnet provided at one of said crankshaft and said camshaft which relatively rotate to a yoke member provided at the other of said crankshaft and said camshaft.

18. A control method according to claim 17 further comprising the step of
detecting a variation in said magnetic flux density by a Hall element.

19. A control method according to claim 16 further comprising the steps of:
detecting a rotational angle of said crankshaft and a rotational angle of said camshaft; and
detecting said rotational phase on the basis of the rotational angle of said crankshaft and the rotational angle of said camshaft which were detected.

20. A control method according to claim 19 further comprising the steps of:
detecting a variation in a gap between an outer periphery of an rotator rotating along with said camshaft, and
detecting a rotational position of said camshaft on the basis of a detected variation in the gap.

21. A valve timing control method for an internal combustion engine, wherein
at a time of starting an engine, a starting time manipulated variable is set on the basis of a manipulated variable set in advance in accordance with an engine temperature, the set starting time manipulated variable is outputted to a variable valve timing mechanism which varies an opening-and-closing timing of an intake valve or an exhaust valve of the engine, and said opening-and-closing timing is controlled to be a starting time timing which is at a further advance side than a maximum retard timing which is retarded at the maximum.

* * * * *